United States Patent [19]
Konrad

[11] Patent Number: 5,974,444
[45] Date of Patent: *Oct. 26, 1999

[54] REMOTE INFORMATION SERVICE ACCESS SYSTEM BASED ON A CLIENT-SERVER-SERVICE MODEL

[75] Inventor: Allan M. Konrad, P.O. Box 4023, Berkeley, Calif. 94704

[73] Assignee: Allan M. Konrad, Berkeley, Calif.

[ * ] Notice: This patent is subject to a terminal disclaimer.

[21] Appl. No.: 08/911,590

[22] Filed: Aug. 14, 1997

Related U.S. Application Data

[63] Continuation of application No. 08/653,556, May 24, 1996, Pat. No. 5,696,901, which is a continuation of application No. 08/481,642, Jun. 7, 1995, Pat. No. 5,544,320, which is a continuation of application No. 08/001,982, Jan. 8, 1993, abandoned.

[51] Int. Cl.$^6$ .............................. G06F 3/00; G06F 13/00
[52] U.S. Cl. .......................... 709/203; 709/202; 709/217
[58] Field of Search ................................... 709/201, 203, 709/217, 224

[56] References Cited

U.S. PATENT DOCUMENTS

| 5,289,574 | 2/1994 | Sawyer | 345/332 |
| 5,544,320 | 8/1996 | Konrad | 709/203 |
| 5,696,901 | 12/1997 | Konrad | 709/203 |

OTHER PUBLICATIONS

A. Konrad, Draft of a Database Profile, dated Jul. 25, 1991, pp. 72–73.
A. Konrad, Draft of Viewgraphs, dated Sep. 5, 1991, pp. 75–88.
A. Konrad, "Demonstration Script," dated Mar. 26, 1991, pp. 1–8.
A. Konrad, "Implementation Plan," dated Feb. 26, 1991 (page Nos. 1–9 added for this IDS).
A. Konrad, Untitled Viewgraphs, (page Nos. 1–5 added for this IDS), 1990.
A. Konrad, Viewgraphs from a presentation entitled "The Remote Database Object Project at Lawrence Berkeley Laboratory," (page Nos. 1–53 added for this IDS), 1990.
A. Konrad, "The LBL Database Object Project," LBLID–1503, dated Oct. 29, 1988.
A. Konrad, "The Remote Database Object Project at Lawrence Berkeley Laboratory," Abstract from SPIRES Workshop, dated Mar. 23, 1990, single page.

*Primary Examiner*—Ahmad F. Matar
*Assistant Examiner*—Khanh Quang Dinh
*Attorney, Agent, or Firm*—Philip H. Albert; Townsend and Townsend and Crew LLP

[57] ABSTRACT

A local host computing system, a remote host computing system as connected by a network, and service functionalities: a human interface service functionality, a starter service functionality, and a desired utility service functionality, and a Client-Server-Service (CSS) model is imposed on each service functionality. In one embodiment, this results in nine logical components and three physical components (a local host, a remote host, and an intervening network), where two of the logical components are integrated into one Remote Object Client component, and that Remote Object Client component and the other seven logical components are deployed among the local host and remote host in a manner which eases compatibility and upgrade problems, and provides an illusion to a user that a desired utility service supported on a remote host resides locally on the user's local host, thereby providing ease of use and minimal software maintenance for users of that remote service.

25 Claims, 16 Drawing Sheets

```
┌─────────────────────────────────────────────────────────┐
│  ( terminate session )           ( start new session )  │
│                                                         │
│            Remote Journal Object                        │
│  ─────────────────────────────────────────────────────  │
│  Getting Acquainted                                     │
│                        Specify level of expertise:      │
│  The database has:                                      │
│                           innocent          expert      │
│  ┌──────────────────┐    ┌───■──────────────────┐       │
│  │ 239314 records   │    └──────────────────────┘       │
│  └──────────────────┘                                   │
│                                             get         │
│  ( help ) (accounting) ( show  ) ( general )(copyright)(special)│
│           ( billing  ) (elements)(information)(permission)(services)│
│  ─────────────────────────────────────────────────────  │
│  Perform Query        ┌────────────────────────────┐    │
│                       └────────────────────────────┘    │
│                               enter value and push a button │
│                                                         │
│                    ( Interrupt Query )         ,302     │
│                                          ↙  ↓  ↘        │
│  (show sample)(show sample)(show sample)( find )( find )( find )│
│  (topic values)(author values)(title values)(title)(author)(topic)│
│                                                         │
│  search for:      filter by:                display format: │
│  ● exact match    ● all papers    ● none    ● none      │
│  ○ begins with    ○ internal      ○ date =  ○ first author │
│                     papers only   ○ date <= ○ report number │
│  sort by: ● default               ○ date >= ○ date      │
│           ○ full                                        │
│           ○ brief                                       │
│           ○ tex                                         │
└─────────────────────────────────────────────────────────┘

Figure 4
```

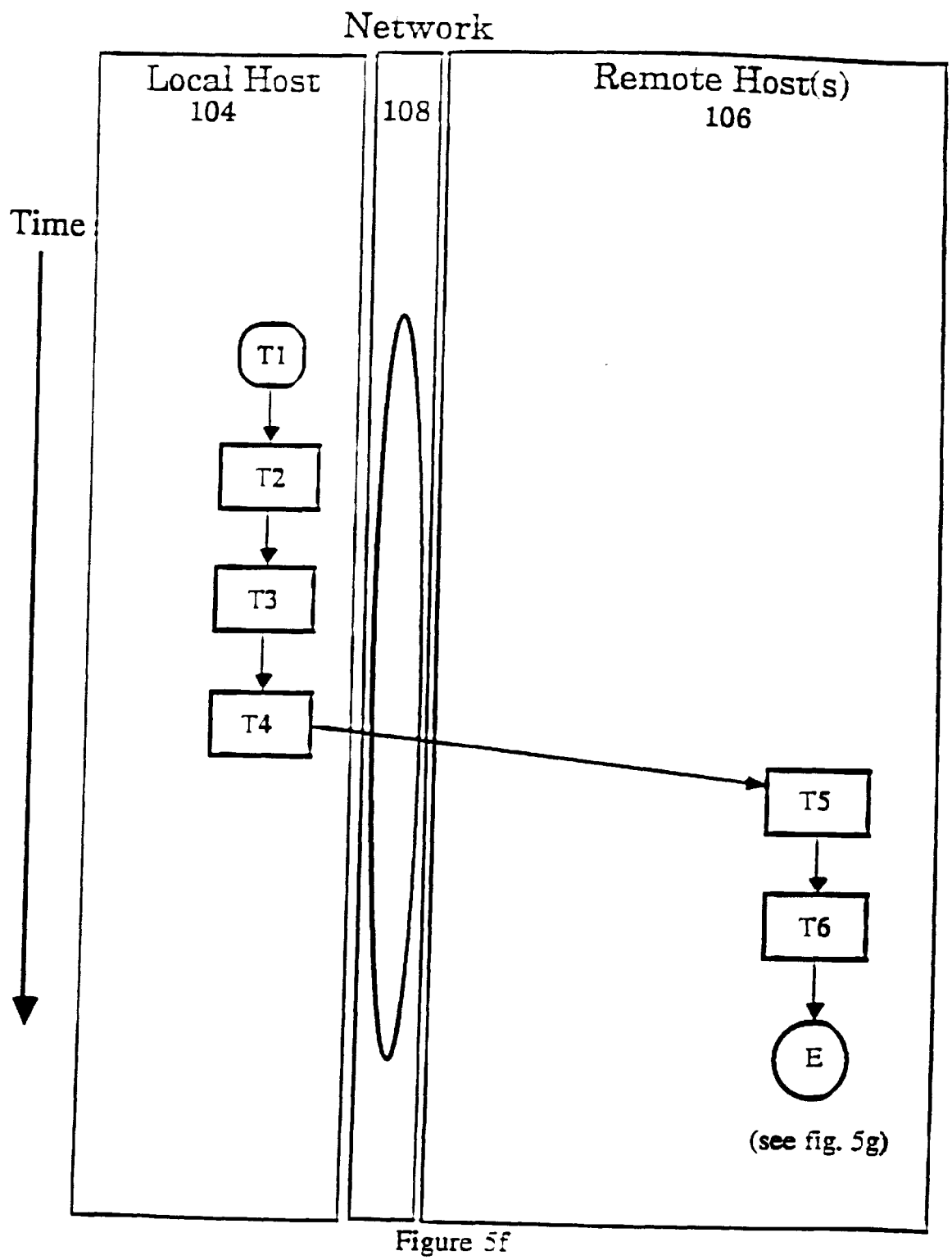

REMOTE INFORMATION SERVICE ACCESS SYSTEM BASED ON A CLIENT-SERVER-SERVICE MODEL

This application is a continuation of U.S. application Ser. No. 08/653,556, filed May 24, 1996, now U.S. Pat. No. 5,696,901, which is a continuation of U.S. application Ser. No. 08/481,642, filed Jun. 7, 1995, now U.S. Pat. No. 5,544,320, which is a continuation of U.S. application Ser. No. 08/001,982, filed Jan. 8, 1993, now abandoned, each of which is incorporated herein by reference for all purposes.

GOVERNMENT RIGHTS

The U.S. Government has a paid-up license in this invention and the right in limited circumstances to require the patent owner to license others on reasonable terms as provided for by the terms of contract No. DE-AC03-76SF00098 awarded by the Department of Energy.

COPYRIGHT NOTICE

A portion of the disclosure of this patent document contains material which is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention relates to the field of information services, more specifically to a system for access to remote information services.

With the proliferation of data sources and services, a person seeking data on any of a variety of subjects can access a database to find data which might have taken laborious research in earlier times. However, with the proliferation of data sources, an information problem arises as the data problem is solved. Users of data are not interested in the data itself, except for those involved in the maintenance and programming of systems to handle the data, but are interested in the information the data contains. For example, a phone book, on-line or otherwise, is a source of information. A person interested only in data would deem a phone book containing one million names to be superior to a phone book containing only one hundred names, since the former contains more data. However, a person interested in information, such as a seeker of a phone number of a particular person, considers both databases equal, so long as both contain the number of the particular person. Indeed, the information seeker might even consider the smaller database to be better, i.e., more informational, if the smaller database is easier to search. Heretofore, the provision of information has been the responsibility of those in charge of data, and thus they have tended to solve the problem of finding information as a problem of finding data.

Human users face many obstacles in obtaining services from remote computing systems. Such services include database services, computational services and use of software libraries, digital publishing service, and many others. Obstacles faced are so numerous that virtually every new software product can address only a small portion of them. However, such obstacles generally result from Primitive Information Resources (defined below), such as network addressing and connectivity, operating systems, language and syntax, query languages, file systems, text editor incompatibilities, and differences in each vendor's implementation of common functions.

Use of local computers, such as personal computers and workstations, provided many benefits relative to logging onto a remote host. However, new obstacles arose as well which require the human user to be cognizant of whether a service resides on their local computer or on a remote computer, and if on a remote computer, be capable of surmounting many challenges on account of Information Primitives, including security, accounting, login, operating system, query language, and including moving output produced on the remote computer to their local computer, or using unfamiliar editors or other tools on the remote host. Another recent approach is to develop interfaces that execute on the local computer and provide easy conveyance of instructions to the remote computer and conveyance of the results back to the local computer. However, even this has the costly burden of installing, maintaining and executing an interface on the local computer, and storing whole search results on the local computer.

Despite vast improvement in many aspects of information technology, there are still many obstacles to access to information that prevent consumers from obtaining and using information effectively. Except for those with computing, network, and information skills, access to remote information resources is still out of reach in a practical sense.

Recently, workstations and personal computers ("PCs") provided graphical user interfaces which allow a user to select and activate a service on the workstation. The user needed only to find the desired icon and select, or click, it with a mouse or other pointing device. However, obtaining services such as database services from computers other than the user's own local host, be it a multi-user time-sharing computer, a PC, or workstation, was much more difficult.

Remote access often required the user to manipulate a network address of the host computer supporting the desired information service, and many other computing and network primitives. Of course, remote access is not just a problem for local PC and workstation users, but also for local users on a multi-user time-sharing system such as a minicomputer or mainframe.

One example of a remote access system is shown in U.S. Pat. No. 5,124,909 (Blakely et al., June, 1992). Therein, requester processes run on a local host, and are used to translate local host commands into commands understood by the remote host. Such a system is illustrative of the types of systems which must be continually updated, on local computers, because improvements in information service software result in new versions of such software. These new versions must be obtained, usually including a purchase cost, for and installed on each local computer. This is known as the "software maintenance burden".

Software upgrading is much more difficult if the software resides on the local host, as shown in Blakely. In that personal computers and workstations are more numerous than information service host computers, the software maintenance burden is not only manyfold greater than if such maintenance were performed only on each remote host, but it is even more problematical because the software maintenance burden falls on the owner/user of the personal computer or workstation, who is much less likely to be able, or inclined, to perform such software maintenance.

The "Information Problem", i.e., how to store and retrieve (search, identify, select, and fetch) information is not a computing problem, although computers might or might not provide services. It is not a network engineering problem, although networks might or might not provide services. It is not solely a library or archival problem, although reference skills and classification techniques developed in the bibliographic profession are essential. It is not a pedagogical problem, but, of course, techniques in the teaching profession are important in conveying information. Yet, by human nature, each of these disciplines blurs the Information Problem to see it as one and the same with the problems addressed by their domain. They each see a part of the elephant, and the solutions don't necessarily interoperate with one another across disciplines.

The commercial sector reflects this trend. Everyone is in everyone else's "information business". Phone companies issue credit cards, financial concerns offer telephone services, cable television firms become database vendors, etc. But each addresses the Information Problem from the perspective of their own strengths, and largely ignores what the other disciplines bring to the solution set. None of these disciplines alone has all the background required to address the Information Problem. When, for example, computer science or data processing people decide to design a technology that provides access to information resources, their inclination is to reason that users have powerful computers on their own desktops, so they write programs that run on all those computers to access remote information services, then sell the software. The fallacy is: though computers have become inexpensive enough to decentralize the repository of computing cycles away from mainframes to the desktop, it does not follow that all the services provided by those mainframe computers should also be distributed.

For example, telecommunications or network engineers may seize upon an Information Problem such as the problem of "how to find directory information about people using the network". Networking and computing are important fields of expertise relevant to this problem, but so are database management and retrieval expertise. Yet implementations of "network solutions" to this problem, such as X.500, reflect ignorance of information retrieval issues understood by the bibliographic community for many years. The result is poor retrieval capability, duplicate databases, maintenance of duplicate databases, and software maintenance on each local host. Other examples are numerous. What is needed is an architecture wherein components are implemented and controlled by those best able to manage and understand the role of the particular component in solving information problems.

From the above it is seen that an improved means for accessing remote information services is needed.

SUMMARY OF THE INVENTION

An improved means for human end-user access to remote information services is provided by virtue of the present invention.

The present invention avoids the costly effects of "solutions" to the information problem which lack the expertise of one or more of the essential domains of expertise, by use of an architecture that deploys the basic service components of an information system such that each component specifically avoids providing functionality that is the primary responsibility of another component and its professional discipline. For example, a database service is utilized in Remote Object technology only for database service, not for human interface service or network service. That is, the database management system doesn't have to produce "screens", and the network service doesn't define database functionality and do a poor job of it (poor or nonexistent indexing, poor retrieval capability, duplicate storage of data, etc.).

One object of the present invention is to provide a means for a computer user at a local host to access remote information services which is as easy as access to services provided on the user's own local host, be it a local multi-user system, a workstation or a PC, and to be able to do so without maintaining on their local host software which is dependent on the configuration or version of the desired service on the remote host, thus requiring upgrades and causing compatibility problems.

Another object of the present invention is to provide remote information services to the consumer market which is comprised of individuals who desire an information service from the remote host, but might not have working knowledge of the interaction required between the local host and the remote host to access that information. Such an object might be obtained by modularization of functionality and a specific deployment of that functionality. The desired utility is an information service provided by a remote computer, including, but not limited to, access to a database management system, use of a specific database, a file storage service, a computational service, software libraries, or bibliographic reference utilities.

Another object of the present invention is to provide a user access to an information service on a remote host without the user needing to know how to deal with the network between the user and the remote host, without the user needing an account on the remote host, and without the user needing to continually update desired utility software.

Yet another object of the present invention is to improve network efficiency, by transmitting from Remote Host to Local Host only that data selected by the User, rather than the entire search result or data set, thereby reducing the amount of data which must flow across the network (but one benefit of the Client-Server-Service (CSS) model) and to increase security over software which interacts with the information service.

The present invention meets these objects by distinguishing among the Basic Service Components (defined below) of a Remote Object information architecture, specifically, a Human Interface Service, a Desired Utility Service, and a Starter Service, imposing a Client-Server-Service model (defined below) upon the Basic Service Components resulting in nine logical components (Human Interface client, server, and service, Desired Utility client, server, and service, and Starter client, server, and service), integrating the Desired Utility Client and the Human Interface Client functionalities into a Remote Object Client (each defined below), and deploying the resulting eight functional components among the local host and remote host in a manner which eases compatibility and upgrade problems, and then specifying protocols for the interactions between specific pairs of those functional components.

In the CSS model, the Client contains most, but often not all, of the decision logic which manipulates the Service. Some decision-making responsibility for manipulating the Service generally rests with the Server as well.

The present invention provides an illusion to a user that a desired utility service supported on a remote host resides locally on the user's local host, thereby providing ease of use and minimal software maintenance for users of that remote service. In one embodiment of a Remote Object system according to the present invention, a user appears to activate a Remote Object as a service of the local host. The user actually activates a starter client, which connects to a starter server on the remote host via a starter connection. The starter server interacts with a starter service, which initiates a Remote Object client. The Remote Object client on the remote host then interacts, as a human interface client, with a human interface server on the local host via a second connection, the Remote Object client connection. The Remote Object client also interacts, as a desired utility client with either a desired utility server on the remote host, or directly with the desired utility service on the remote host.

The present invention provides many benefits to users and service providers, as few of which are: (1) Using an embodiment of the present invention, the connection providing access for the User to the Desired Utility Service is initiated, not by the User, but by a process on the Remote Host (namely, the Remote Object Client), thereby giving the Service Provider greater control of security; (2) Not only is usage of the network more efficient by not conveying whole search results or data sets, only those selected by the User after seeing them, but such search results and data sets need not be stored by User at Local Host, thus conserving storage resources; (3) The User is not limited to character-based presentation, but can have full bitmapped presentation; (4) The Remote Object access can be implemented for an existing Desired Utility Service without requiring existing users of that service to modify the way they access that service; (5) The Service Provider can control what versions of software are used by Users; (6) The illegal copying of software is reduced, since none of the Desired Utility Service software is located on the Local Hosts; (7) The present invention provides for multiple simultaneous usages of an information resource where heretofore, only one person could use it at any one moment, such as with a CD-ROM drive; (8) The likelihood of software viruses is reduced, since none of the Desired Utility Service software is located on the Local Hosts; and (9) The incompatibility of data retrieval from remote locations with programming resources such as text editors and spreadsheets on the Local Host is surmounted, by delivering data via a Human Interface Server platform which is compatible with such popular programs.

A further understanding of the nature and advantages of the inventions herein may be realized by reference to the remaining portions of the specification and the attached drawings.

BRIEF DESCRIPTION OF THE DRAWINGS

FIG. 4 is a screen image of an example of a Remote Journal Object; and

FIGS. 5(a)–(i) are flow diagrams showing the operation of and interaction between the various components of a Remote Object system.

DESCRIPTION OF THE PREFERRED EMBODIMENTS

Figure 1:
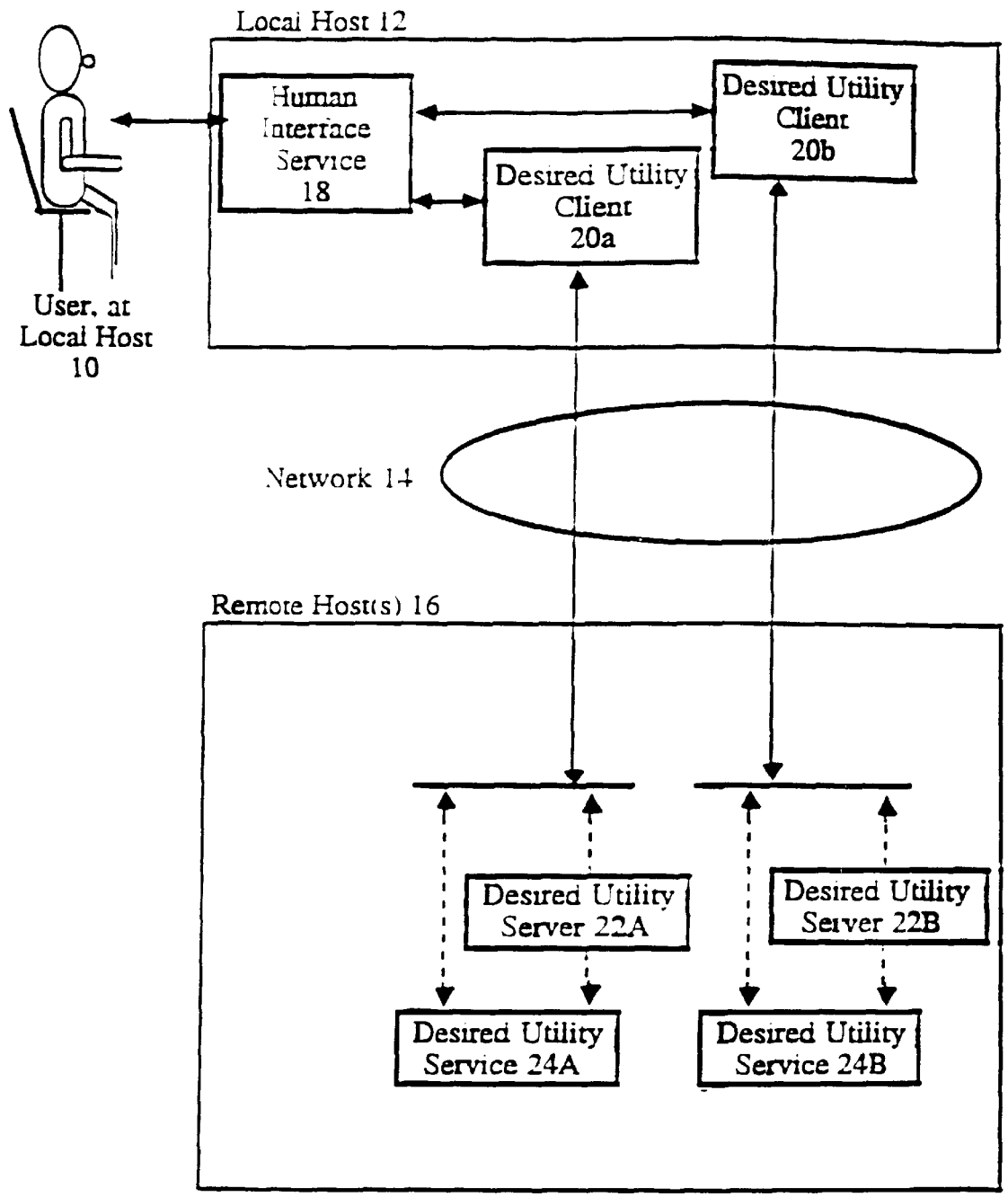
FIG. 1 is a prior art block diagram of a typical remote access system.

For ease of discussion, this detailed description is divided into seven sections, as follows:

1. General Definitions
2. Definitions of components of one embodiment of a Remote Object system according to the present invention.
3. Examples of Remote Objects.
4. Description of the Figures.
5. Description of Remote Object Processes. a. Initiating a Remote Object. b. Operations with a Remote Object. c. Terminating a Remote Object.
6. Description of the Protocols between components.
7. Examples of Components for use in a Remote Object System.

1. General Definitions

Certain terms, for clarity, are capitalized in this and the following section to indicate that they are separately defined herein.

Client-Server-Service (CSS) Model:

A model wherein three processes operate to provide a Basic Service. A Client process makes demands upon a Server process, which then satisfies these demands using the Service process or capability.

One example of imposing a CSS model upon Basic Service is where the Basic Service is a particular database. In this specific example, the Client process is a program running on a user's local computer, in the prior art. Suppose the Client desires some data which must be retrieved using a database service provided on a Remote Host. The Client does not retrieve this data, but rather sends a Request for service to a Server process. Typically, this Request is communicated over the Network to a Server process running at the remote Host. The Server process does not make demands, but is passive until a Request from a Client arrives. The Server then accepts the Request, and conveys the Request to the database Service. The Server then retrieves the response from the database Service (i.e., the requested data) on the remote Host, and returns the response to the requesting Client.

The advantages of the model are similar to the advantages of a full-service grocery store as opposed to a self-service store. In the full-service model, the customers (Clients) request goods (Service) from the merchant (Server). The advantage over the self-service model, where the Clients manipulate the Service directly, are clearly apparent by analogy. In the grocery store, the Clients do not need to know the location of any goods in the store, and thus don't need to memorize different layouts of different stores. The advantages to the Server are also apparent, as the Server can now provide for greater control for security and filtering purposes, thus lessening the chance that an untrained Client may, for whatever reason, cause disruption of the Service. The knowledgeable merchant is also free to rearrange the store to increase efficiency and not confuse the customer.

Often, the term "Server" is used in a way that suggests that it is one and the same as the Basic Service it provides, but generally, this is not true. A Server is an intermediary between the Service and the Client, although the Server is likely to be provided by the same vendor, and on the same Host as the Basic Service, and the Boundary between the Server and the Service might not be clear.

Basic Service Components:

Human Interface Service, Desired Utility Service, Starter Service.

Boundary:

A barrier to interoperability, such as:

Network Boundary: A Boundary where two nodes have no network address in common. Thus, a network boundary must be crossed where a Client process has one network address and a Service process has a different network address, and no common network address functionality can be obtained between the two points.

Instruction Set Boundary: A Boundary caused by Services and Clients not being processable in a common instruction set, thereby preventing one from processing instructions of the other.

Security Boundary: A Boundary created to prevent or limit incoming Requests to particularly authorized Requests or Requests from an authorized Requester.

One-to-Many Boundary: A Boundary created by the lack of a one-to-one correspondence between Services and Clients. This boundary requires multiplexing or demultiplexing for Client access to a Service.

Accounting or Commercial Transaction Boundary: A Boundary created to control access to a Service, to enable access to the Service to be recorded or billed to a entity generating the Request for the Service.

Channel Boundary: A Boundary created by dissimilar interfaces or limitations of Client or Service processes. For example, if a Service is not configured to accept a Request from a program, but only from a computer terminal, a Channel Boundary is created. A Server may be used to cross that Boundary, by re-routing the input of the Service and communicating with the Client.

Platform Boundary: (Also the Class-of-Platform Boundary) A Boundary created by dissimilar operating systems supporting the Client process and the Service process. This Boundary is a barrier to product interoperability.

Client:

A process which generates and issues Requests in the CSS model defined above. Also known as a Requester.

Server:

In the Client-Server-Service Model, an intermediary between a Client and Service. A Server is often used to surmount a Boundary. A Server may multiplex Requests from multiple clients to a Service and demultiplex responses from the Service to the appropriate Clients. A Server is not required if there is no Boundary, i.e., where Client and Service can interoperate directly.

Service:

In the Client-Server-Service Model, functionality to be provided to a Client by a Service Provider.

Service Provider:

Owner or manager of a desired Service.

Request:

In the Client-Server-Service Model, a generic term for instructions, commands, data, or combinations thereof conveyed between the Client and the Server, and between the Server and the Service.

Connection:

An interprocess communication path between a two processes such as a Client and a Server.

Host:

A computer, or collection of computers, interoperating with one another, used to run a particular process. For example, it is possible that a Starter Server (defined below) is running on one computer, and a Remote Object Client (also defined below) to be started is on another. The two computers could be treated as a single Host.

Essentially, a "Host" is a means for computing.

Protocol:

An instruction set using a controlled vocabulary which processes use to interoperate.

Network Service Protocol:

A protocol for interoperating over a network (one embodiment defined below). Examples: Internet Protocol Suite, Open Systems Interconnect (OSI) Protocol Suite.

Primitive Information Resources:

Includes, but is not limited to, networks, computers, command syntax, peripherals, operating systems, file systems, computer centers, FORTRAN, COBOL, C, application systems, database management systems, query languages, system programmers, and staff for processing transactions relating to login accounts, passwords, documentation orders, computer charges, etc., instruction sets, addresses, data element identifiers, and printed and online documentation about such items.

User:

Human consumer of a service.

Window Manager:

A Client which provides a uniform interface to the User of a Local Host for manipulating application windows, such as moving and resizing windows, and iconifying and deiconifying windows. The Window Manager mediates the demands for resources on the workstation of the Local Host (defined below) which runs the Human Interface Server (also defined below). The Window Manager receives Requests from Clients and determines whether and how to satisfy the Requests.

2. Descriptions and Definitions of Remote Object Components

The following is a detailed description and definition of the components in one embodiment of a Remote Object system according to the present invention.

2.1 Local Host

The Host with which the User interacts directly, and which supports the Human Interface Service (2.4) (physical and program), among other processes. The Local Host also operates a Starter Client (2.11), and Human Interface Server (2.5). Example: CPU, operating system, memory, file storage or connection thereto, and network service (2.3) including: physical connectivity, program for executing Network Services Protocols (see definition in section 1), and a network identity (an address).

2.2 Remote Host

The Host which supports the non-local functional components of a Remote Object system, including a Starter Server (2.10), one or more Starter Services (2.9), one or more Remote Object Clients (2.6), one or more Desired Utility Services (2.7) and Desired Utility Servers (2.8) (when required).

A computer, or multiplicity of computers interoperating with one another, not having network address that is functionally identical to network address(es) of the Local Host (2.1). While nothing in the present invention prevents the Remote Host and the Local Host from being one and the same (i.e., a single Host which interacts with the human user and supports the Desired Utility Service(s)), such a configuration is a trivial example of the present invention, but might be very useful for network testing and education.

Typically, the best indicator that a Host is "remote" as opposed to "local" is that the network address of the Remote Host is different than the network address of the Local Host. A Remote Host might be multiple interoperating Hosts collectively supporting those functional components of a Remote Object system designated to be deployed on the Remote Host. For example, the Starter Server might reside on one machine, the Remote Object Client on another, and the Desired Utility Service on another. Examples of such systems are shown in FIGS. 3(a)–(d).

2.3 Network

A means for conveying data between a Local Host (2.1) and a Remote Host (2.2). The Network can use any of several Network Service Protocols to transfer data. A Network conveys data among computers using radio frequency spectrum broadcast or physical conduit, circuit switching or packet switching, point-to-point, point-to-multipoint, or multipoint-to-multipoint methods. Also used to convey data among the computers comprising Remote Host (2.2), where Remote Host comprises a multiplicity of computers interoperating together.

The network is made up of nodes (each Host), and provides for transmission of data from node to node based upon an address of a recipient nodes, and provides network services (routing, domain name service, and management services).

2.4 Human Interface Service

The Human Interface Service supports computer-human interaction between the Local Host and the user based on the human senses. This is made up of devices that provide for either conveying data from computer to the human user, or from the human user to computer using sensory channels of sound, tactile and touch, vision, taste, or smell. Includes window managers and device drivers associated with specific human interface devices.

The User initiates (see 5.1.Op2) Remote Object service by activating a Starter Client (2.11). Activation may be performed by a plurality of Human Interface Service methods, including, for example, clicking a pointer on an icon on the visual display, by issuing an oral instruction to a voice recognition device, or other Human Interface Service functionality supported on the Local Host (2.1).

The User manipulates the Human Interface Service to specify services desired (see 5.2.Op1). As well, the Human Interface Service processes Requests from the Human Interface Server (2.5) (see 5.2.Op11). For example, data to be displayed visually are conveyed to the visual output portion of the Human Interface Service, audio data are conveyed to the audio output portion of the Human Interface Service, olfactory data are conveyed to the olfactory output portion of the Human Interface Service, tactile data are conveyed to the tactile output portion of the Human Interface Service, and gustatory data are conveyed to the gustatory output portion of the Human Interface Service.

An example of a Human Interface Service is a keyboard and its associated polling and buffering routines. Such a service performs the actual interface functions, such as conveying visual or other data from a host to a human user and from the human user to the computer. Of course, the functionality of the service need not be visual in nature, but merely sensory, and is not limited to existing interfaces. For example, whether in a conventional computer system or an advanced system such as an artificial reality system, the interface could be visual computer display devices (printers, CRT devices, headsets), visual input devices, audio output devices (speakers), audio input devices (microphones), tactile output devices (data suits, pressure suits, heat devices), tactile input devices (keyboards, mice, trackballs, touch screens, Polhemus devices such as data gloves or data helmets, heat sensing devices, pressure sensing devices), even olfactory or gustatory I/O devices, and other human sensory-to-computer I/O devices, or combinations thereof, including their associated drivers.

Human Interface Services might also include processes such as window managers and device drivers associated with particular interface devices. In some embodiments, several logical layers exist between a Starter Client, a Human Interface Server and the Human Interface Service, the logical layers often dictated by local host platform requirements, such as device independence, multi-user permission schemes, code portability, compiler constraints, etc.

The Human Interface Service functionality is provided by the Local Host.

2.5 Human Interface Server

A logical entity which mitigates the effects of network Boundaries between a Remote Object Client (2.6) and a Human Interface Service (2.4), the effects of instruction set Boundaries between a Remote Object Client and a Human Interface Service, and the effects of Class-of-Platform Boundaries between a Remote Object Client and a Human Interface Service by providing Class-of-Platform independence.

A Human Interface Server interoperates with a Remote Object Client, maintains programmatic connectivity to both a Human Interface Service and a Remote Object Client and conveys Requests from each to the other, multiplexes Requests from multiple human interface clients, including Remote Object Clients to a Human Interface Service, and demultiplexes Requests from a Human Interface Service to the appropriate human interface clients, including Remote Object Clients.

An example of a Human Interface Server is the X Windows server created at the Massachusetts Institute of Technology. One example of a Boundary crossed in such a system is a One-to-Many Boundary, such as when multiple X Windows are present on a display.

The Human Interface Server functionality is provided by the Local Host.

2.6 Remote Object Client

Activated by Starter Service (2.9). A Remote Object Client uses Remote Object Protocol (6.3) to interoperate with a Starter Service (2.9).

A Remote Object Client adds value to the services provided to the human user in that Human Interface Client functionality is tailored to the functionality of the specific Desired Utility Service(s) (2.7), and in that it is easily initiated by virtue of User's use of a Starter Client (2.11), and in that Remote Object Clients alleviate the burden on the user of having to know how to use the instruction set of the Desired Utility Service(s) by: (1) translating requests received from the Human Interface Server (2.5) into appropriate Desired Utility Client instruction set requests for the Desired Utility Service and by supplementing those translated requests with additional requests to enhance the value of the desired utility service to the human, and (2) translating requests received from the Desired Utility Service or Server into appropriate Human Interface Client instruction set requests for the Human Interface Server and by supplementing those translated requests with additional requests to enhance the value of the desired utility service to the human.

The Remote Object Client functionality is provided solely on the Remote Host (2.2). A Remote Object Client may operate on the same or different Remote Host (2.2) as the Desired Utility Service, Starter Server (2.10), or Starter Service (2.9).

In the CSS model, a Remote Object Client combines the functionality of a Human Interface Client and a Desired Utility Client.

A Human Interface Client is the logical entity in the CSS model which issues Requests directed to a Human Interface Service, usually via a Human Interface Server. An example the functionality of a Human Interface Client is that provided by an X Windows Client embedded into a Remote Object Client.

A Desired Utility Client is the logical entity in the CSS Model which issues Requests directed to the Desired Utility Service.

A Processed Remote Object Request is a Request according to a Human Interface Service Protocol translated into an instruction set appropriate for a Desired Utility Service (or Desired Utility Server, if required) and supplemented with additional Requests, as necessary, to enhance the value of Desired Utility Service to the user.

2.7 Desired Utility Service

Also known as a Target Service, it supplies the computer-based functionality desired by human user(s).

Particular examples of desired utility services include a database management system, use of a specific database, an information service, a file storage service, a printing service, a backup service, a computational service, software libraries, and bibliographic reference utilities.

The Desired Utility Service functionality is provided by the Remote Host (2.2).

2.8 Desired Utility Server

A Desired Utility Server provides the functionality specified by a Desired Utility Client (2.6) to a Desired Utility Service (2.7) when direct interaction is obstructed by a Boundary, and the functionality specified by the Desired Utility Service to the Desired Utility Client when direct interaction is obstructed by a Boundary. A Desired Utility Server is generally transparent to a Desired Utility Client.

A server is not required if a client and service can interoperate directly.

A Desired Utility Server accepts Requests from a Desired Utility Client, such as a Remote Object Client (2.6), processes those Request(s) to surmount Boundary(ies), then submits such processed Requests to a Desired Utility Service (2.7). It also accepts Requests from a Desired Utility Service, processing those Request(s) to surmount Boundary(ies), then submits such processed Requests to a Remote Object Client.

For Network Boundaries: Uses a dedicated data connection, or Network Service (2.3) or comparable functionality for conveyance of Request(s) among a multiplicity of Remote Host (2.2) computers such that Request(s) can be conveyed successfully from the Remote Object Client to a Desired Utility Service, and to a Remote Object Client from a Desired Utility Service.

For Channel Boundaries: If a Desired Utility Service is not configured to accept Request(s) from a program, but only from a computer terminal, the Desired Utility Server may perform conversion of Request(s) from a Desired Utility Client, such as a Remote Object Client into Request(s) by providing a Host Language Interface.

For Security Boundaries: If a Security Boundary intervenes between a Desired Utility Client, such as a Remote Object Client, and a Desired Utility Service, a Desired Utility Server performs the appropriate security tasks.

For Commercial Transaction Boundaries: If a Commercial Transaction Boundary intervenes between a Desired Utility Client, such as a Remote Object Client, and a Desired Utility Service, the Desired Utility Server performs the appropriate commercial transaction tasks.

For One-to-Many Boundaries: A Desired Utility Client mitigates the effects of One-to-Many Boundaries between the Desired Utility Client, such as a Remote Object Client and the Desired Utility Service.

This component is supported by the Remote Host (2.2).

2.9 Starter Service

Also known as a supervisor, this component initiates, or launches, a Remote Object Client (2.6), and assures that every usage of the Remote Object Client (2.6) tailored for each specific Desired Utility Service (2.7) is using the current master version. This is because only one stored instance of the Remote Object Client for a specific Desired Utility Service need exist. The Remote Object Client exists on the Remote Host (2.2) rather than on a multiplicity of Local Host machines (2.1). The Remote Object Client may be initiated into operation by multiple simultaneous Starter Services, each operating the Remote Object Client as an individual instance devoted to providing a particular Desired Utility Service to specific Local Hosts.

A Starter Service initiates Remote Object Clients on instructions from a Starter Server (2.10), and in some embodiments, reports status, including termination, of the Remote Object Client, to the Starter Server. Typically, a Starter Server and a Starter Service are always available for Requests whenever the Remote Host is in service.

This component is supported by the Remote Host (2.2).

2.10 Starter Server

Also known as a connection manager. This component selects and assigns a Remote Object Client (2.6) to each initial request for a Desired Utility Service (2.7), and conveys that assignment to the Starter Service for the assigned Remote Object Client, and maintains data about the status of all assignments. The Starter Server receives Requests from one or more Starter Clients (2.11), and interacts with one or more Starter Services (2.9) to respond to the Request for a Remote Object Client initiation. A Starter Server bridges a network Boundary on behalf of the User between the Local Host and Remote Host, and a security Boundary, thereby enabling the Service Provider, not the User, to retain control over who initiates a connection to the Desired Utility Service and receives its benefits.

This component is supported by the Remote Host (2.2).

2.11 Starter Client

This component issues Request(s) to a Starter Server (2.10) to cause initiation of a Remote Object Client (2.6). This component enables a user to easily initiate access to a Desired Utility Service (2.7) without working knowledge of network addressing or instruction sets, and to request initiation of a Remote Object Client to provide a Desired Utility Service to Local Hosts (2.1).

In some embodiments, a Starter Client is either a Human Interface Client which can interact with a Human Interface Server (2.5), or the Starter Client is a program which cannot functionally interact with the Human Interface Server, but instead interacts directly with the Human Interface Service (2.4).

This component is supported by the Local Host (2.1).

3. Examples of Remote Objects

The following is a list of examples of different Remote Object systems. It is not an all-inclusive list of Remote Object systems, but shows a number of possible applications of the present invention.

3.1 Remote Object

The generalized system for obtaining access to a service on a remote host computer, typically comprising a personal computer host at a user site, and a remote host machine, with a network between the two, further comprising particular functional components deployed on the Local Host, particular functional components deployed on the Remote Host, and further comprising protocols practiced by certain of these functional components.

One embodiment of the local host might use a window manager, an X11 X Window display server and a program for presenting audio and other non-visual digitized data on appropriate devices, e.g. speakers, datagloves, and eyephones.

Generally speaking, this and other specific examples of Remote Object systems differ from the generic Remote Object system in the nature of the desired utility service supported. In each of the following Remote Object systems, the components common to all Remote Object systems are customized as necessary. The Desired Utility Client portion of the Remote Object Client is configured to properly interact with the Desired Utility Service of the particular Remote Object system.

The examples of Remote Objects below are distinct from one another only in that: (1) the underlying Desired Utility Service is different, (2) the Remote Object Client is tailored to the Desired Utility Service, (3) the Remote Hosts might be different, (4) the Starter Server distinguishes among the Remote Object based upon the identifier of the Desired Utility Service-Remote Object combination, and (5) each Remote Object might have different Starter Clients.

3.2 Remote Database Object

A Remote Object system for obtaining database records from a remote host computer, where the remote host supports a Desired Utility Service which performs database searching and retrieval, and also supports a Remote Database Object Client which sends and receives Requests to and from a database management system on the remote host. The Remote Object Client converts the responses to a form suitable for the human interface server on the local host. Some embodiments of a Remote Database Object system may include the elements shown in Table I.

A variation in of the Remote Database Object is a Remote Data Object which provides data access service on remote host computer, including retrieval of data files. The Desired Utility Service in a Remote Data Object system is a program for sending data and instructions, and issuing commands to, a data management system on the remote host.

Possible Presentations:
  Shutdown Presentation
  Identification Presentation
  Introductory Presentation
  Perform Query Presentation
  Display Query Presentation
  Search Result Management Presentation
  Search Result Content Presentation
  Diagnostics Presentation
  Special Service Presentation
  where Presentation may include:
    a visual expression such as a window,
    an aural expression,
    an olfactory expression,
    a tactile expression, and/or
    a gustatory expression
  and where each Presentation consists of specific functionalities such as follows:
    Shutdown Presentation:
      Terminate Session button
      Start New Session button
      Select a database widget
    Introductory Presentation:
      Live Human Help Online widgets
      Get Copyright Permission widget
      Royalty Authorization widget
      Accounting/Billing widgets
      Taxi Cab meter
      Show data elements widget
      General Information button
      Database Size indicator
      Specify User Level of Expertise widget
    Perform Query Presentation:
      Enter search values widget
      Show sample values widget
      Find buttons
      Filter toggles
      Exact Match toggles
      Sort By widgets
      Display Format selection widgets
      Perform special retrieval tasks widgets
    Search Result Management Presentation:
      # of Records in current search result widget
      Show/use session history widget
      Convey search result to Local Host widget
      Convey search result to E-mail address widget
      Print search result content widget
      Fax search result widget
      Clear Result widget

TABLE I 3.3 Remote Learning Object

A Remote Database Object system where Desired Utility Service comprises a database, where each record in the database comprises a record key, data elements (Subject Matter) containing data to present information to be taught (text, still or video images, audio, etc.), data elements (Question) containing a question or an assignment about the Subject Matter, data elements (Scoring) containing instructions to Remote Host to evaluate the User's response to a Question, data elements containing pointers to subsequent records that should be presented to student based upon Scoring of a previous Question.

3.4 Remote Publishing or Reference Object

A Remote Database Object system where Desired Utility Service further comprises a publishing service on the remote host, including editing, peer-review, version and concurrent update control, archiving, and distribution services.

Examples:
  Remote News Object
  Remote Newspaper Object
  Remote Textbook Object
  Remote Directory Object
  Remote Journal Object
  Remote Dictionary Object
  Remote Encyclopedia Object 3.5 Remote Collaboration Object A Remote Database Object system where Desired Utility Service further comprises asynchronous editing, peer-review, real-time interactive service, and distribution.

3.6 Remote Remote Object Object

A Remote Database Object system where the Desired Utility Service further comprises instances of specific Remote Object Starter Clients for Specific Remote Objects for specific Platforms.

3.7 Remote Current Awareness Object

A Remote Database Object system where the Desired Utility Service further comprises a database with records comprising a key element (Key), a data element identifying a User (UserID), an element identifying the Target Resource for which Current Awareness service is desired, data elements containing descriptions indicating what data from Target Service should be retrieved (Profile), data elements containing the date and time the User's profile was last processed against Target Resource (LastDate), an element containing the postal or network address to which the retrieval results should be sent (Address).

3.8 Remote Market Object

A Remote Object system where the Desired Utility Service further comprises, for example, functionality to place a want ad, make a purchase, make a purchase from a catalog, or locate available real property:

Examples:
Remote Want Ad Object
Remote Purchasing Object
Remote Real Estate Loan Object
Remote Airline Ticket/Reservation Object
Remote Browse Real Estate Object
Remote Place an Item For Sale Object
Remote Job Application Object
Remote Legal Counsel Object
Remote Physician Object
Remote Professional Counsel Object
Remote Expert Counsel Object
Remote Market Survey Object
Remote Electorate Survey Object 3.9 Remote Reality Simulation Object A Remote Object system for supplying artificial reality-based services from a remote host. A Remote Reality Simulation Object has a Desired Utility Service which provides artificial reality-based services on the remote host. The Remote Object Client in this system interacts with the Desired Utility Service, and in turn issues requests to the Human Interface Server on the Local Host, to create the illusion of an artificial reality system running on the Local Host.

3.10 Remote Entertainment Object

A Remote Database Object system where the Desired Utility Service further comprises the functionality to:

Request and have presented on Local Host, a
  Motion Picture preview,
  A full length motion picture, or
  A Video
Request a video game executing on Remote Host
Request to obtain a book review
Request to participate in a computer-based Treasure Hunt.

3.11 Remote Museum Object

A Remote Database Object system where the Desired Utility Service further comprises a database containing digital representations of museum objects where such representations can be delivered to the Local Host and experienced in any of the five senses.

3.12 Remote Communication Object

A Remote Object system wherein the Desired Utility Service provides communication services for voice, mail, and other communications media supported on a remote host.

3.13 Personalized Remote Objects

A personalized profile associated with a Starter Client for placement of widgets on-screen and other parameters; a first person simulation of interacting with a likeness of the user as an intelligent agent.

4. Description of the Figures

In view of the above definitions, the Figures will now be described. FIG. 1 is an example of the prior art, while FIGS. 2–5 illustrate exemplary embodiments of Remote Object systems according to the present invention.

FIG. 1 shows a user 10 interacting directly with a local host computer 12 and indirectly, through a network 14, with a remote host 16. In particular, user 10 uses a Human Interface Service 18 to interact with a Desired Utility Client 20*a*, which in turn interacts with a Desired Utility Server 22*a*, which interacts with a Desired Utility Service 24*a*. To interact indirectly with a second Desired Utility Service 24*b*, user 10 uses Human Interface Service 18 to interact with a second Desired Utility Client 20*b*, which in turn interacts with a second Desired Utility Server 22*b*, which interacts with Desired Utility Service 24*b*.

One example of a Desired Utility Service is a commercial database service, which provides data in response to queries. In such a system, user 10 formulates a query using Human Interface Service 18, which might be an interactive, mouse-driven entry screen, and passes the query to one of the Desired Utility Clients, say 20*a*. Desired Utility Client 20*a* is typically a program supplied by the commercial provider of the database service, which encapsulates the query in a form understandable by Desired Utility Server 22*a*. Desired Utility Server 22*a* is also typically a program supplied by the commercial provider. In some cases, the Desired Utility Server is not used, and the Desired Utility Client interacts directly with the Desired Utility Service.

When Desired Utility Server 22*a*, or Desired Utility Service 24*a*, as the case may be, is ready with a response to the query, the results are passed back to Desired Utility Client 20*a*. Of course, Desired Utility Client 20*a* must also be programmed to deal with the particular responses received from components 22*a* or 24*a* on Remote Host 16. Desired Utility Client 20*a* must also be programmed to initiate the connection to Remote Host 16. Furthermore, because the client portion of the CSS-modelled Desired Utility resides on Local Host 12, the control of operations of the Desired Utility reside with the Local Host. Also, because the client functionality resides on local host 12, if any of the desired utilities are modified in a manner requiring a new protocol or instruction set between Desired Utility Client 20*a* and Server 22*a*, the software at the local host may need to be updated.

Figure 2:
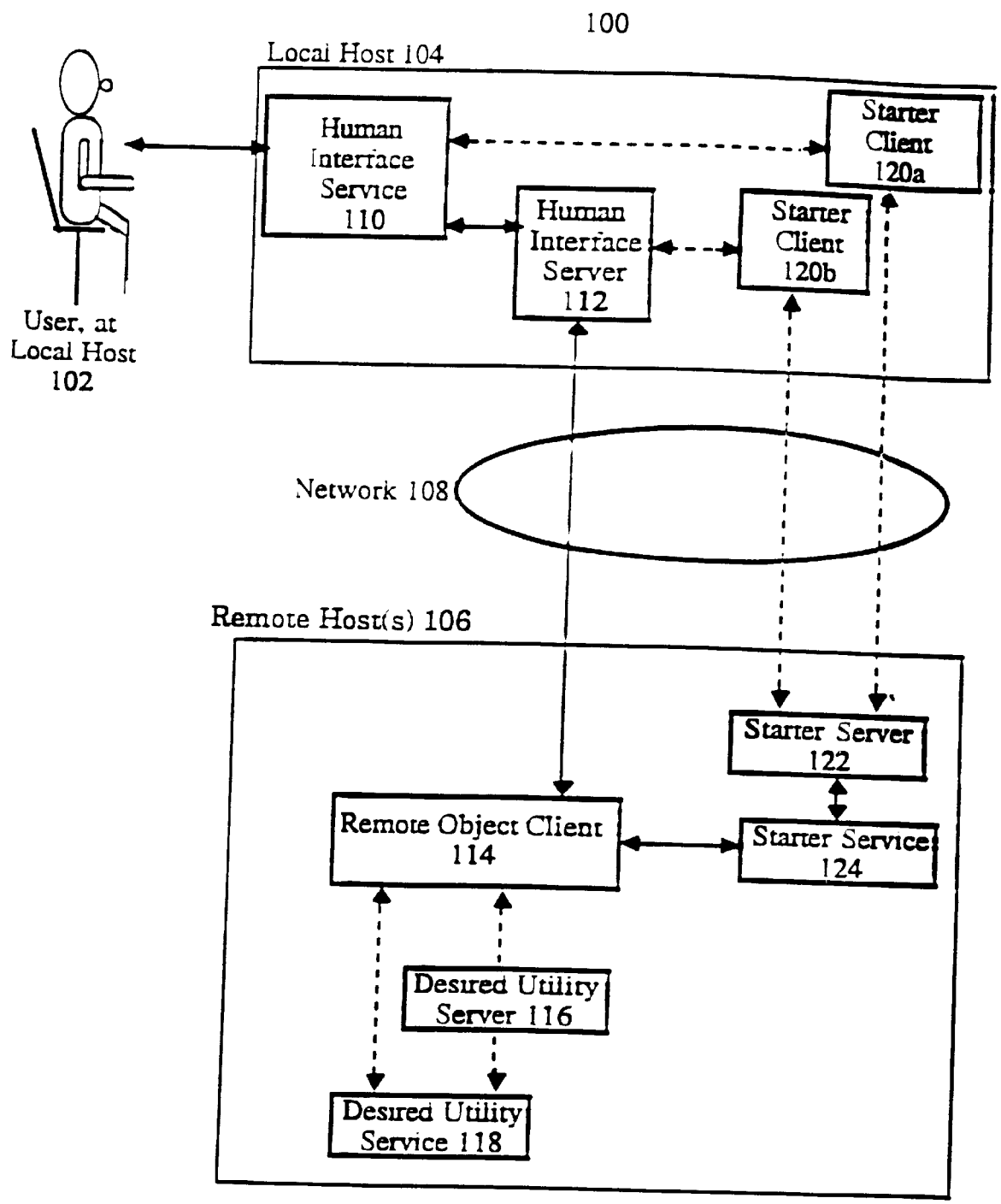
FIG. 2 is a block diagram of an embodiment of a Remote Object remote access system according to the present invention.

FIG. 2 is a block diagram of a Remote Object system 100 which addresses these problems. In the embodiment shown, a user 102 interacts with a Human Interface Service 110, which is supported by Local Host 104. User 102 does not interact directly with a Network 108 connecting Local Host 104 to a Remote Host 106, nor does user 102 interact directly with Remote Host 106, or even initiate a program that directly interacts with a Desired Utility Service 118 on remote host 106. Instead, user 102 initiates a Starter Client 120 (of which 120*a* and 120*b* are examples) on Local Host 104. Starter Client 120 may be either a Human Interface Client (see Starter Client 120*b*) which can interact as a client in the CSS model with a Human Interface Server 112, or a program (see Starter Client 120*a*) which interacts directly with Human Interface Service 110.

To initiate access to the desired utility, Starter Client 120 sends a Request for a Remote Object Service to a Starter Server 122 supported by Remote Host 106. Starter Server 122 adjusts the Request into a form required by a Starter Service 124, and in some embodiments, selects and assigns a Starter Service and a Remote Object Client for each incoming Request. If the Request is unsuccessful, a negative response is returned to Starter Client 120.

However, if successful, Starter Server 122 transfers a Request to Starter Service 124 according to a protocol described below, and Starter Service 124 performs the service of launching an instance of a Remote Object Client 114. Remote Object Client 114 contains substantially all of the functionality needed to interact, as a client, with a Desired Utility Service 118, which provides the functionality required by the user. Although a well-used example of such a system is a database utility service and a corresponding Remote Database Object system, a Remote Object system is capable of handling many other types of utilities desired by user 102.

A Desired Utility Server 116 is used where necessary to bridge a boundary between Remote Object Client 114 and Desired Utility Service 118. However, in some embodiments, Remote Object Client 114 interacts directly with Desired Utility Service 118.

The paths between functional elements shown in FIG. 2 will now be described. The interaction between user 102 and Human Interface Service 110 comprises user input, such as input from microphones and keyboards, and user output such as printed pages, screen displays, and speaker output.

The interaction between Starter Client 120a and Human Interface Service 110 comprises Requests for user input/output ("I/O"). The dashed path between Starter Client 120a and Starter Server 122 carries Requests to instantiate, or launch, a Remote Object Client. Because the path is only needed to launch the Remote Object Client, this connection need not be maintained while the desired utility is being accessed. A similar path is shown between Starter Client 120b and Starter Server 122, although Starter Client 120b interacts with the user for user I/O via Human Interface Server 112.

The interaction between Starter Service 124 and Remote Object Client 114 allows Starter Service 124 to launch Remote Object Client 114. In some embodiments of the present invention, Starter Server 122 and Starter Service 124 are initiated by Remote Host 106 when Remote Host 106 begins operating, and Starter Service 124 launches Remote Object Client 114 using the operating system of Remote Host 106.

The interaction between Remote Object Client 114 and Human Interface Server 112 comprises Requests made by Remote Object Client 114 for I/O, made to Human Interface Server 112.

The interaction between Remote Object Client 114 and Desired Utility Server 116 (or Desired Utility Service 118, as the case may be) comprises Requests made by Remote Object Client 114.

The timing and relationships between the various interactions between the components of a Remote Object system, including the operation, termination, and error processing, are further described in FIGS. 5(a)–(i) and accompanying text.

FIGS. 3(a)–(d) illustrate several possible variations on the basic Remote Object system shown in FIG. 2.

Figure 3A:
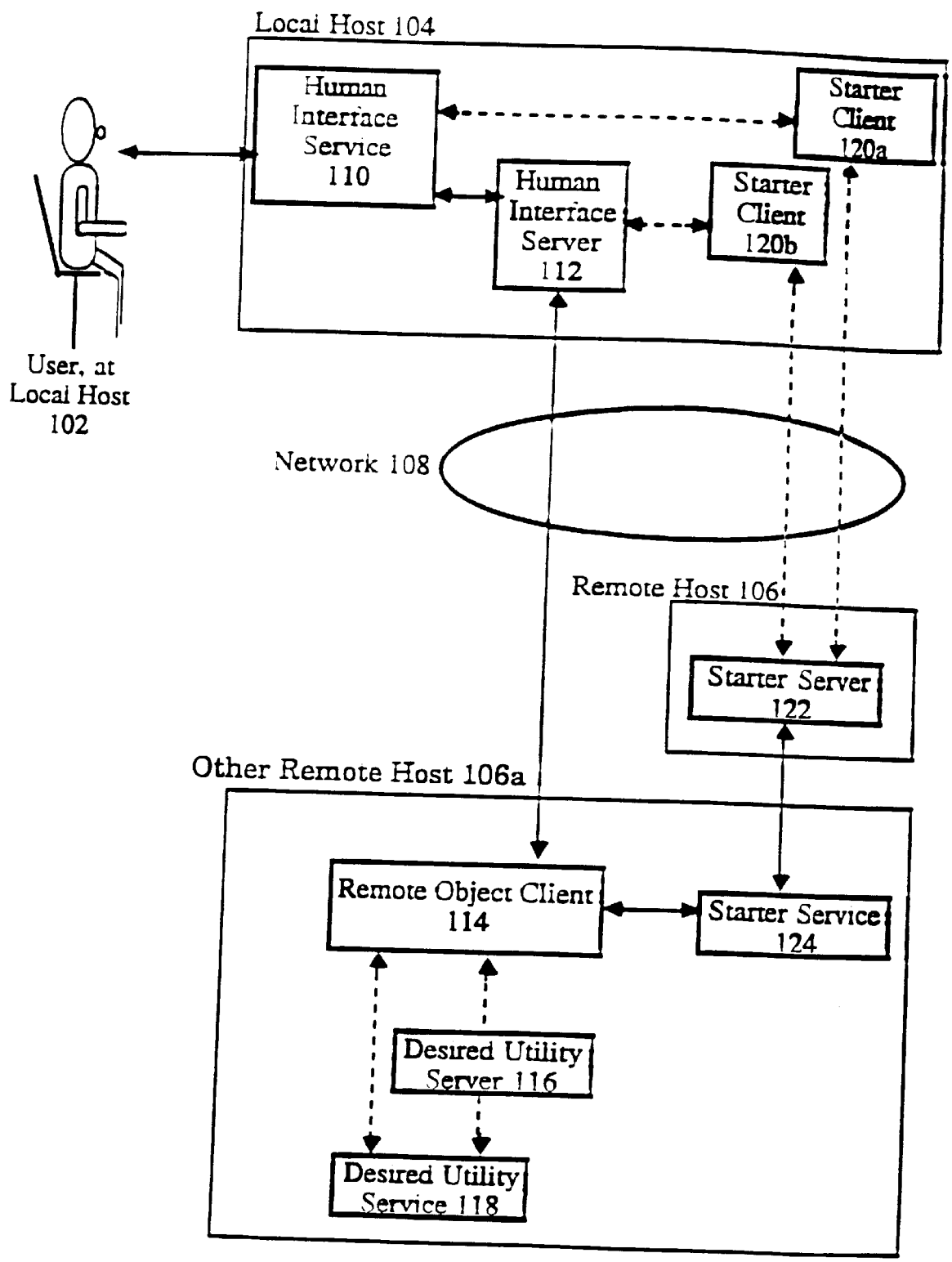
FIGS. 3(a)–(d) are block diagrams of embodiments of Remote Object systems derived from the system shown in FIG. 2, wherein multiple similar functional components or hosts are used.

FIG. 3(a) shows a Remote Object system wherein, Starter Server 122 resides on one remote host 106, but the remaining remote functions reside on another remote host 106a. FIG. 3(a) also shows two Starter Clients 120a, 120b, the former communicating directly with Human Interface Service 110, and the latter communicating with user 102 via Human Interface Server 112. Although FIG. 3(a) shows one of each type of Starter Client-to-user connection, other variations are possible, For example, a Local Host might support multiple Starter Clients such as client 120a, but none such as client 120b, and/or multiple Starter Clients each of which initiates access to a different specific Desired Utility Service, and the Desired Utility Services may reside on different Remote Hosts.

Figure 3B:
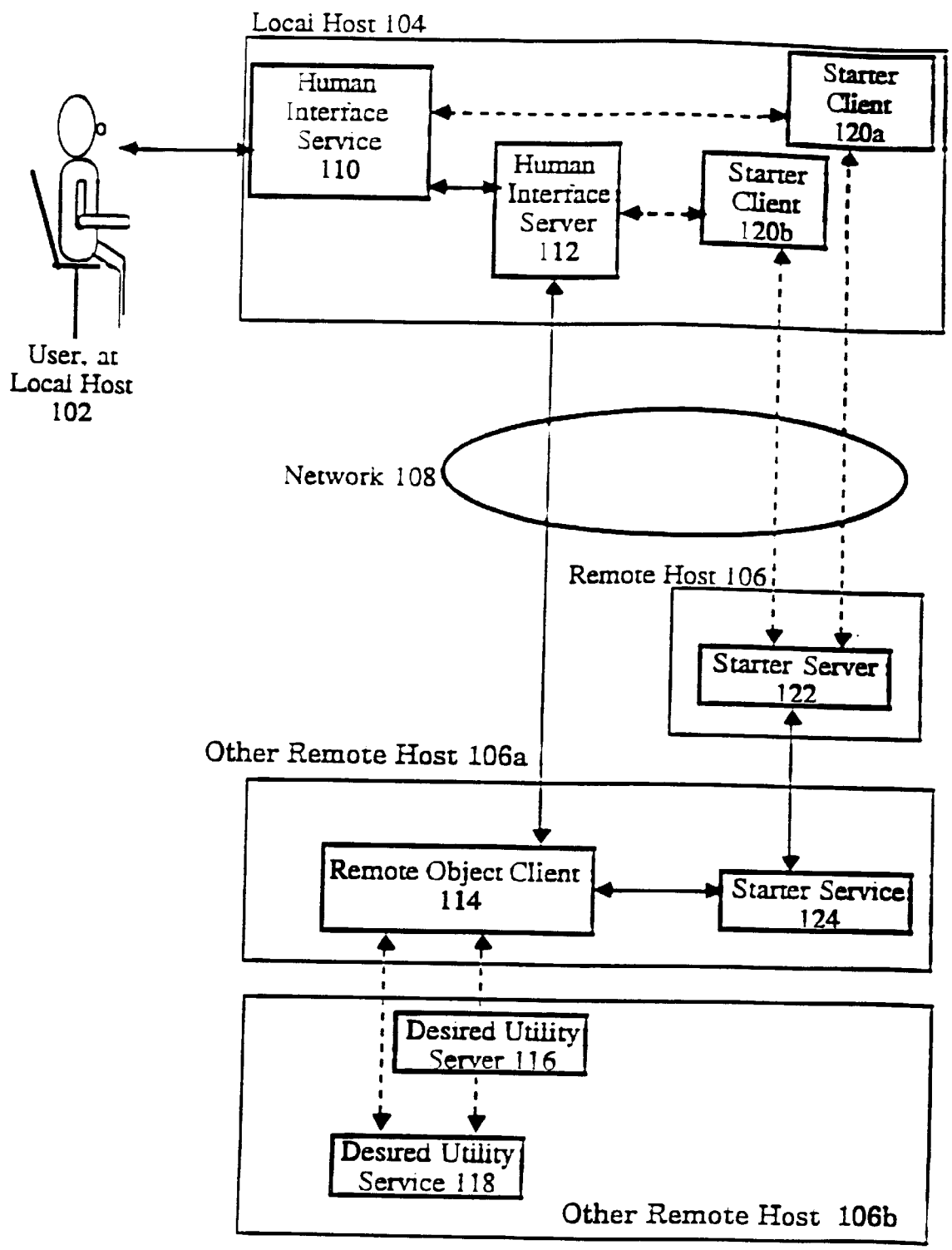

FIG. 3(b) shows a variation of the system shown in FIG. 3(a), where Remote Host 106 supports Starter Server 122 and Remote Host 106a supports Remote Object Client 114 and Starter Service 124, but where yet another Remote Host 106b supports Desired Utility Server 116 and Service 118.

Figure 3C:
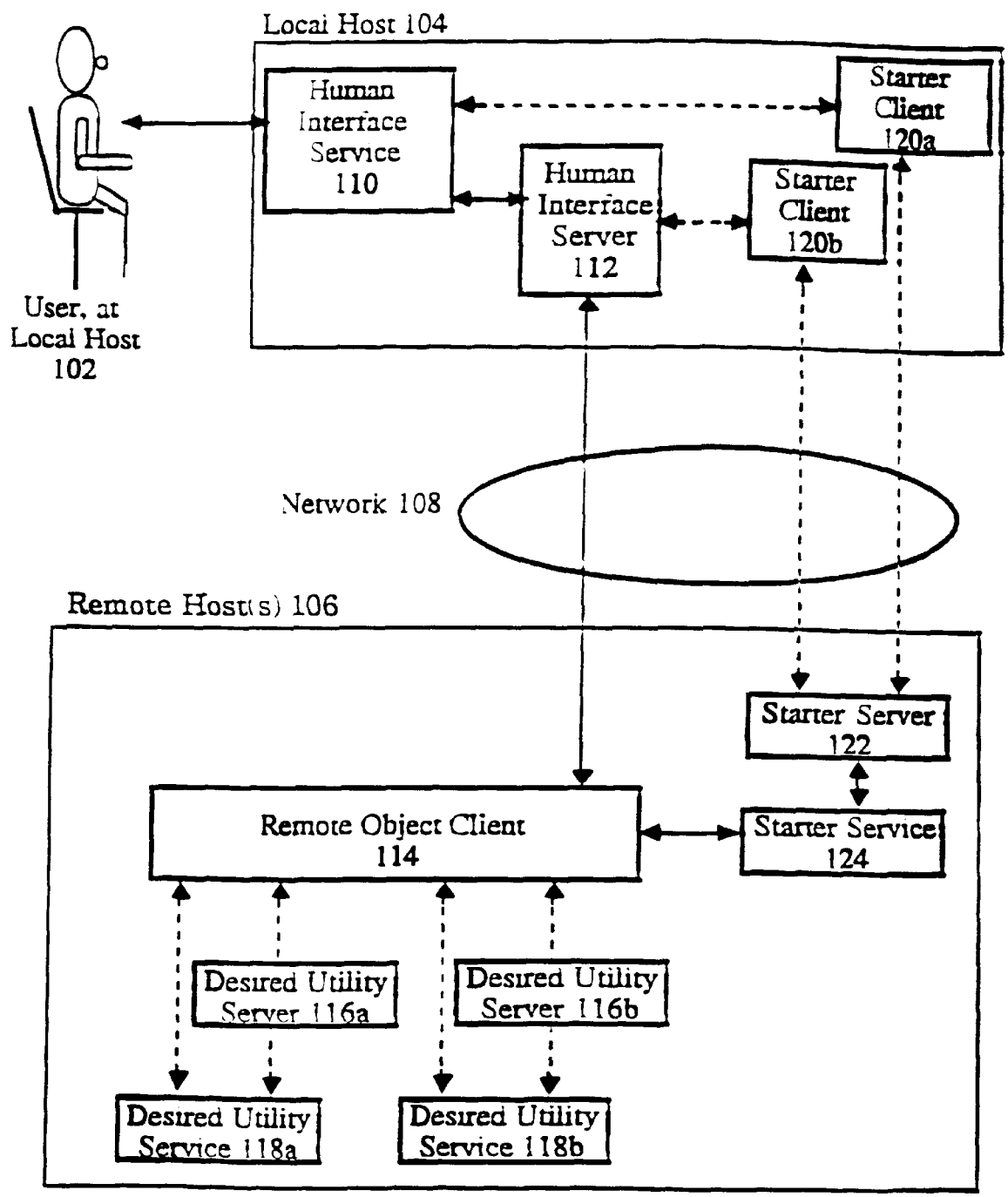

FIG. 3(c) shows a variation where Remote Object Client 114 includes functionality of multiple Desired Utility Clients in order to interact as a client with more than one Desired Utility Server/service.

Figure 3D:
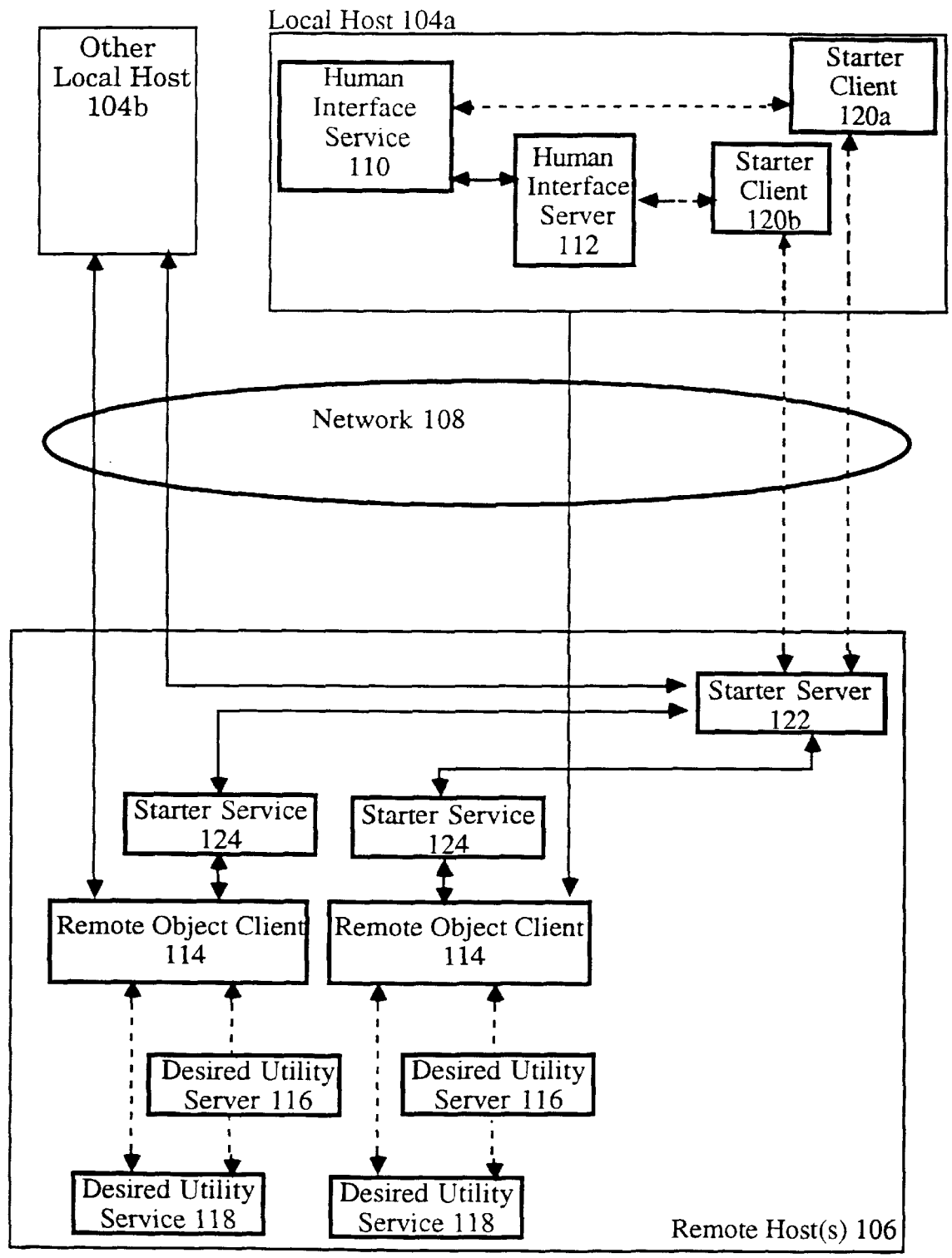

FIG. 3(d) shows a variation where multiple Remote Object Clients 114 are supported by a Remote Host means and where the Remote Object Clients are clients to Human Interface Servers on multiple Local Hosts.

FIG. 4 shows an example of a Human Interface Server and Service response to a display Request issued by a Remote Database Object Client, in the form of a user screen. As shown in FIG. 4, the exact display is particularly dependent on the organization of data by the remote desired database utility service. For example, buttons 302 would not make sense if the remote desired database utility service didn't include means for searching data by title, author, and/or topic.

5. Description of Processes (refer to FIGS. 5(a)–(i))

FIGS. 5(a)–(i) form a flow diagram showing the interaction between the various components of a Remote Object system according to the present invention. Of particular interest are the flows which occur when (1) a user wants to start a Remote Object Client, (2) when the Remote Object Client is operation, and (3) when the Remote Object Client is terminated. Also of interest are the interactions (1) between a Starter Client and a Starter Server, (2) between a Starter Server and Starter Service, and (3) between a Starter Service and a Remote Object Client, which are called Remote Object Protocols. The Remote Object Protocols are discussed in Section 6.

Figure 5A:
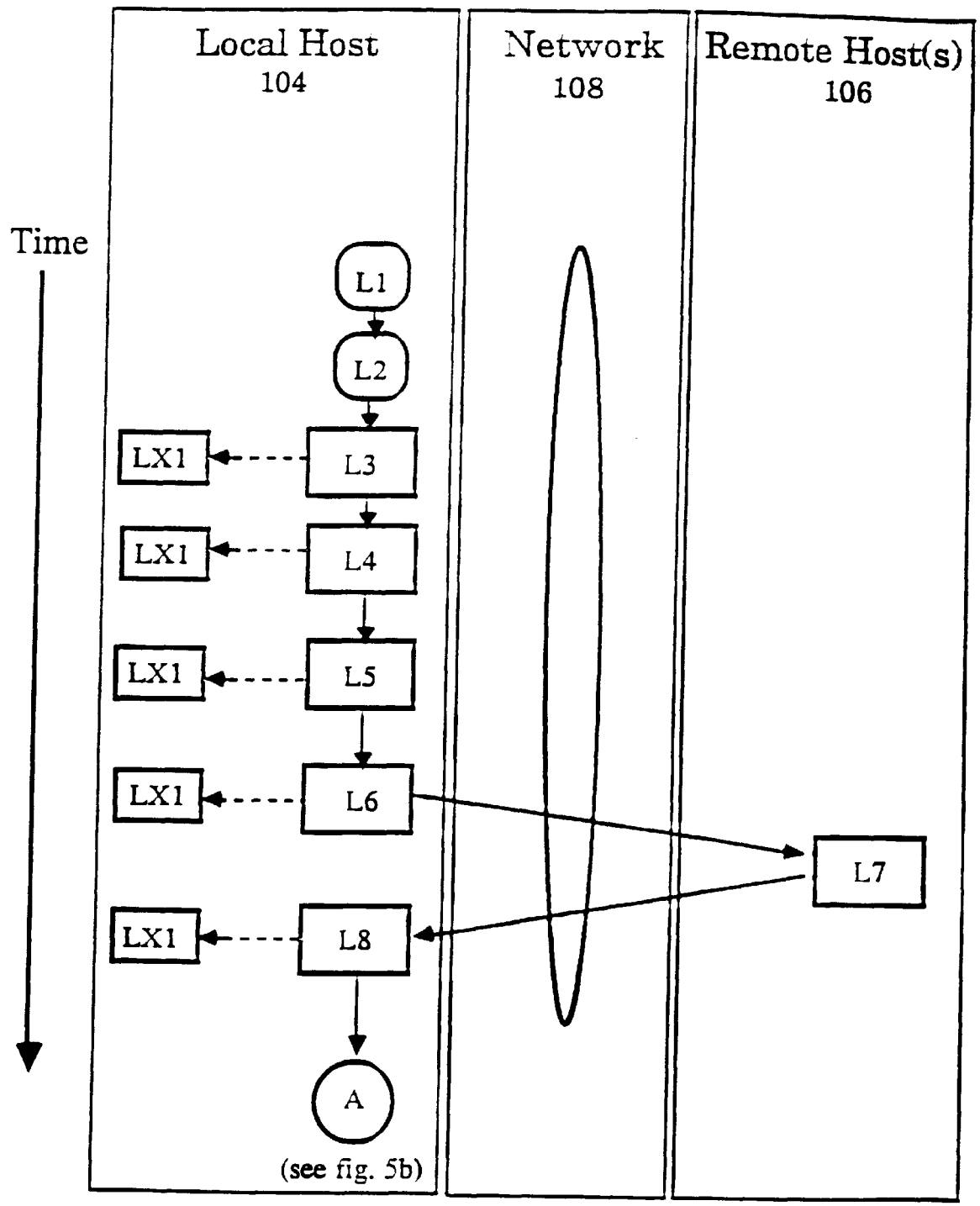
Figure 5B:
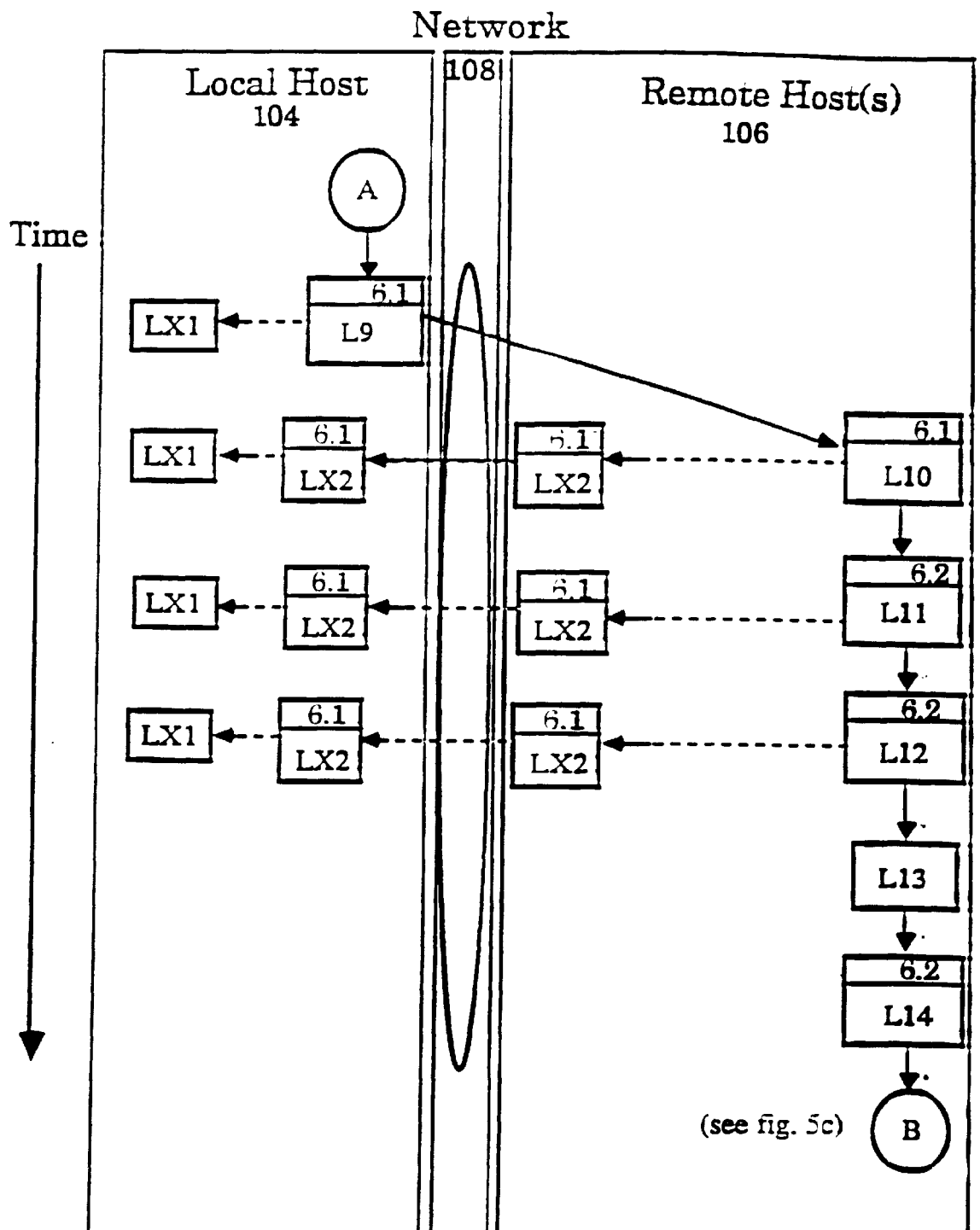
Figure 5C:
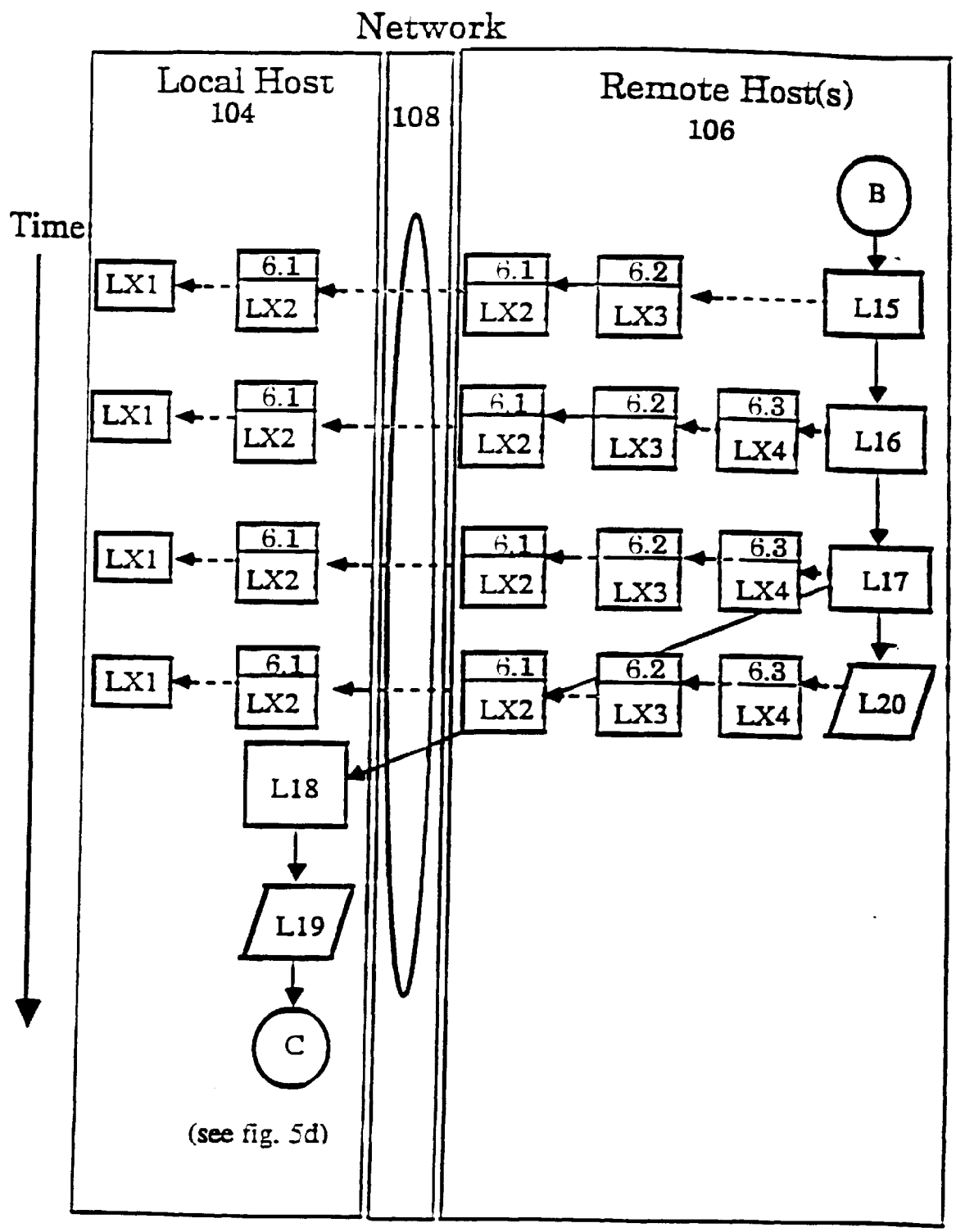

5.1 Events to Launch a Remote Object (L1–L20):

This subsection references FIGS. 5(a), 5(b), and 5(c). For each step, or event, a parenthetical note is made of the host which supports the functionality required to perform the step.

| | |
|---|---|
| L1 | (Local) User selects a Remote Object representation, such as an icon, of the service desired by the user. This representation is, in fact, a representation of a Starter Client (2.11) configured for the specific Desired Utility Service (2.7) the user desires to use. Remote Object representations may be icons containing a name or image representing the Desired Service to which the Remote Object provides access, or other functionality for representing the Starter Client that can be expressed by the Human Interface Service (2.4) on the Local Host. |
| L2 | (Local) User initiates Remote Object service by activating Starter Client. Activation may be performed by a plurality of Human Interface Service methods, including, for example, clicking a pointer on an icon on the visual display, or by issuing an oral instruction to a voice recognition device, or other functionality supported on the Local Host. |
| L3 | (Local) Starter Client optionally confirms operational status of network connectivity and Network Service Protocol(s) on Local Host. If status is not operational, perform LX1. Otherwise, perform L4. |
| L4 | (Local) Starter Client optionally confirms operational status of Human Interface Server (2.5). If status is not operational, perform LX1. Otherwise, perform L5. |
| L5 | (Local) Starter Client gathers data, including data identifying (a) Network Address of Local Host, (b) network address and other required address data of Starter Server (2.10) on Remote Host (2.2), (c) Human Interface Service resources on Local Host, (d) Human Interface Server resources on Local Host, (e) Desired Utility Service to be provided, as well as optional |

-continued

| | |
|---|---|
| | Personal Profile Data and data enabling Remote Object Client (2.6) to utilize Network Services Protocols to perform services including file transfer and electronic mail on Local Host (2.1). The Starter Client also assembles Remote Object Protocol (6.1) Request(s). If L5 fails, perform LX1. Otherwise, perform L6. |
| L6 | (Local) By practicing Network Service Protocols, Starter Client issues Request(s) for establishment of network connectivity to a Starter Server on the Remote Host. If L6 fails, perform LX1, otherwise, perform L7. |
| L7 | (Remote) Starter Server accepts Request(s) from Starter Client for connectivity and sends Request(s) confirming connection to Starter Client, all by practicing Network Service Protocols. If L7 fails, return error Request(s). |
| L8 | (Local) Starter Client confirms Request(s) received from Remote Host by establishing connection. Starter Client determines that step L8 fails if no valid Network Service Protocol Requests are received prior to a Network Service Protocol timeout. If L8 fails, perform LX1, otherwise, perform L9. |
| L9 | (Local) By practicing Remote Object Protocol 6.1 and Network Service Protocol, Starter Client sends Remote Object Protocol Request(s) assembled in L5 to Starter Server. If L9 fails, perform LX1. Otherwise, perform L10. |
| L10 | (Remote) By practicing Remote Object Protocol 6.1 and Network Service Protocol, Starter Server receives Remote Object Protocol Request(s) assembled in L5 from Starter Client. If valid Remote Object Protocol Request(s) assembled in L5 are not received within time specified within Starter Server, perform LX2, terminate connection and return to ready state. Otherwise, perform L11. |
| L11 | (Remote) By practicing Remote Object Protocol 6.1 and Remote Object Protocol 6.2, Starter Server uses content of Remote Object Protocol 6.1 Request(s) assembled in L5 and received from Starter Client in L10, and data describing current status of Starter Service, which Starter Server maintains, to select and assign appropriate Starter Service (2.9) capable of initiating Remote Object service to the Desired Utility Service. If L11 fails, perform LX2 and return to ready state, otherwise, perform L12. |
| L12 | (Remote) By practicing Remote Object Protocol 6.2, the Starter Server assembles and sends to the assigned Starter Service one or more Remote Object Protocol 6.2 Requests containing the assignment formulated in L11 and the content of the Remote Object Protocol 6.1 Request(s) assembled in L5. If L12 fails, perform LX2 and return to ready state. Otherwise, perform L13. |
| L13 | (Remote) Starter Server logs the assignment and status of the assigned Starter Service. If L13 fails, return error Request(s). |
| L14 | (Remote) By practicing Remote Object Protocol 6.2, the Starter Service receives Remote Object Protocol 6.1 Request(s) from the Starter Server. If L14 fails, return error Request(s). |
| L15 | (Remote) Starter Service initiates the Remote Object Client selected and assigned in L11. If L15 fails, perform LX3 and return to ready state. Otherwise, perform L16. |
| L16 | (Remote) The Remote Object Client establishes programmatic connectivity with the specified Desired Utility Service directly (or via a Desired Utility Server (4.8), when required). If L16 fails, perform LX4 and terminate the Remote Object Client. Otherwise, perform L17. |
| L17 | (Remote) By practicing the Human Interface Service Protocol (which may practice the Network Service Protocol), or by practicing Network Service Protocol and Human Interface Service Protocol separately, the Remote Object Client establishes specific programmatic connectivity to an operating Human Interface Server on the Local Host, and sends Human Interface Service Protocol Request(s) to the Human Interface Server on the Local Host to cause specific Human Interface Service expression of initiation of Remote Object service to be presented on the Local Host. This expression of initiation of Remote Object service is programmatically embodied in each specific Remote Object Client (for example, see FIG. 4). If L17 fails, perform LX4 and terminate the Remote Object Client. Otherwise, perform L18. |
| L18 | (Local) By practicing the Human Interface Service Protocol (which may practice the Network Service Protocol) or by practicing the Network Service Protocol and the Human Interface Service Protocol separately, the Human Interface Server receives and implements Human Interface Service Protocol Request(s) issued in L17 to cause specific Human Interface Service expression of initiation of Remote Object service to be presented on Local Host. |

NOTE:
At this point, interaction between the Remote Object
Client and Human Interface Server becomes asynchronous, each
able to generate Request(s) to send to the other.

| | |
|---|---|
| L19 | (Local) The Human Interface Server awaits Human Interface Service Protocol Requests from the Human Interface Service to be caused by user activation of devices representing specific requests for service. |
| L20 | (Remote) The Remote Object Client awaits Human Interface Service Protocol Requests from the Human Interface Server containing specific requests for service. By practicing Remote Object Protocol 6.3, the Remote Object Client determines that L18 or L19 has failed if no Human Interface Service Protocol Requests are received prior to a timeout specified within Remote Object Client. If L18 or L19 fails, perform LX4 and terminate the Remote Object Client. Otherwise, perform Op1. |
| LX1 | (Local) The Starter Client Requests Human Interface Service to present message to advise status, or advise corrective action or both. Terminate or suspend Starter Client. |
| LX2 | (Remote) By practicing Remote Object Protocol 6.1 and the Network Service Protocol, the Starter Server sends to Starter Client, and Starter Client receives, Remote Object Protocol 6.1 Request(s) to perform LX1. |
| LX3 | (Remote) By practicing Remote Object Protocol 6.2 and the Network Service Protocol, the Starter Service sends to Starter Server, and Starter Server receives, Remote Object Protocol 6.2 Request(s) to perform LX2. |
| LX4 | (Remote) By practicing Remote Object Protocol 6.3 and the Network Service Protocol, the Remote Object Client sends to Starter Service, and Starter Service receives, Remote Object Protocol 6.3 Request(s) to perform LX3. |

Use of Remote Procedure Calls:

The following steps may be implemented alternatively by Remote Procedure Call (RPC) technology: L6–L10, L12, L14, L15, L16, LX1–LX4, and Remote Object Protocols 6.1, 6.2, 6.3.

5.2 Events to Operate a Remote Object

Figure 5D:
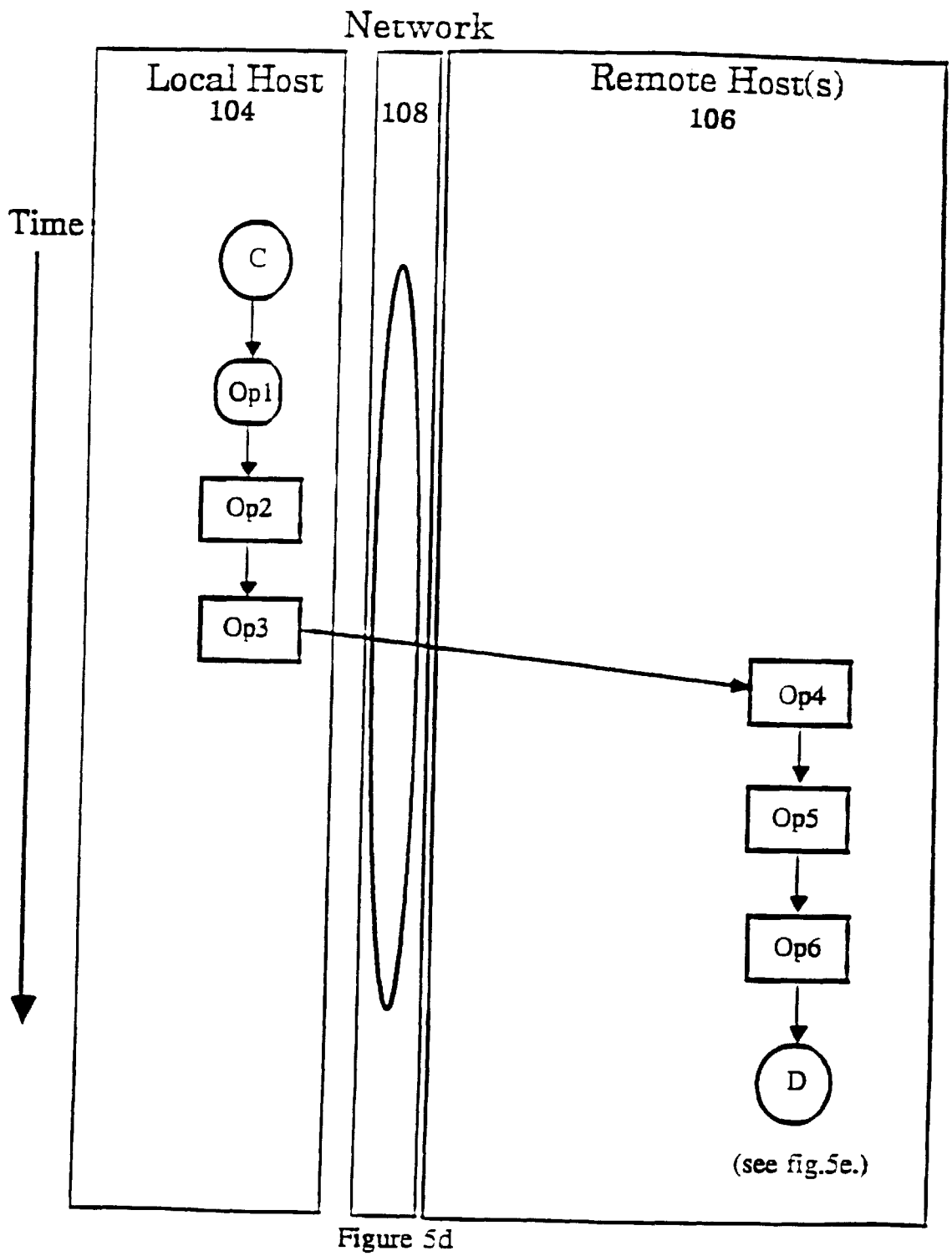
Figure 5E:
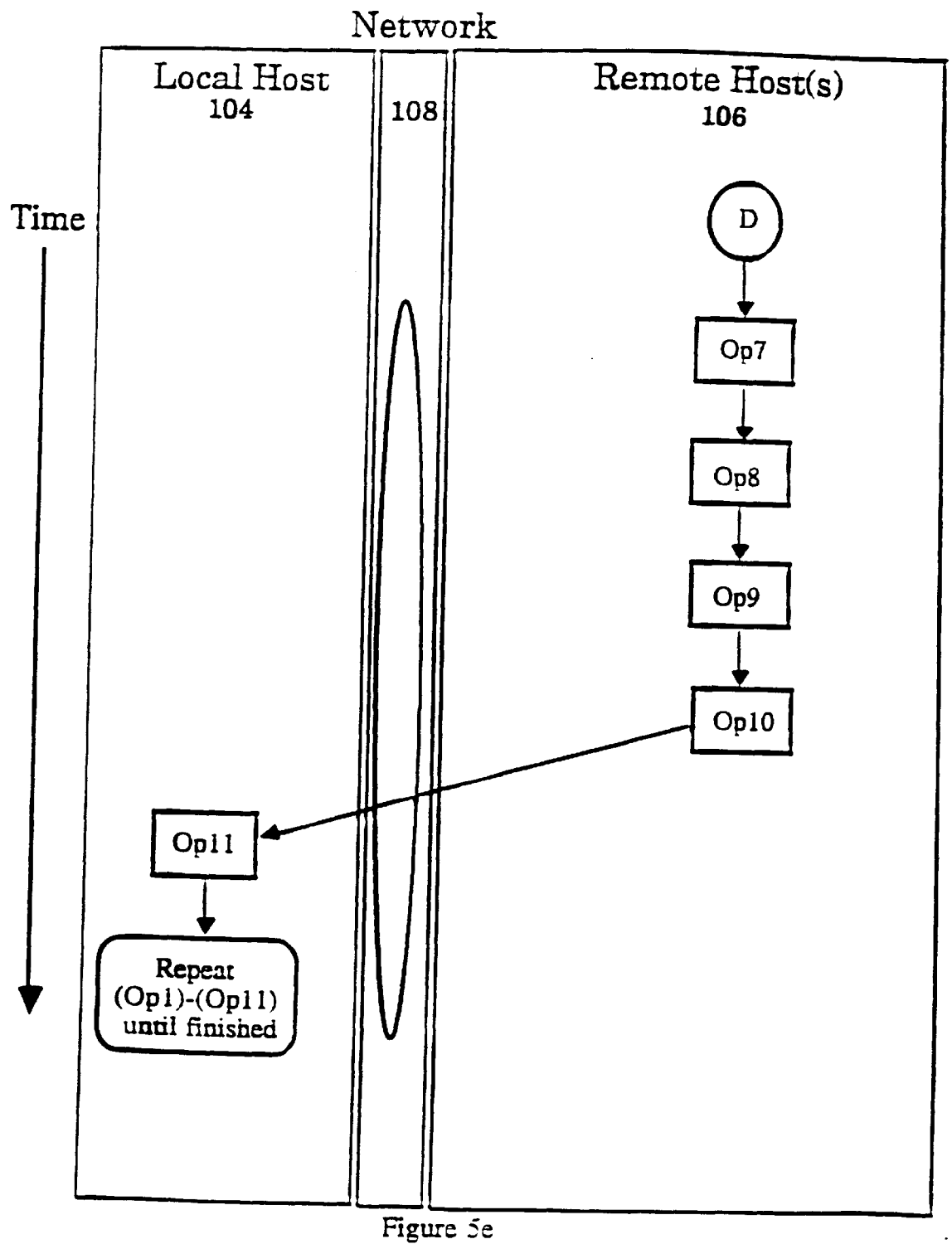

This section references FIGS. 5(d) and 5(e).

| | |
|---|---|
| Op1 | (Local) User manipulates the Human Interface Service to specify services desired. |
| Op2 | (Local) The Human Interface server captures Request(s) from step Op1 and converts those Request(s) to Human Interface Service Protocol Request(s). If Op2 fails, return error Request(s). |
| Op3 | (Local) By practicing the Human Interface Service Protocol and the Network Service Protocol, the Human Interface Server transmits Human Interface Service Protocol Request(s) generated in Op2 to Remote Object Client on the Remote Host. If Op3 fails, return error Request(s). |
| Op4 | (Remote) By practicing the Human Interface Service Protocol and the Network Service Protocol, the Remote Object Client receives Human Interface Service Protocol Request(s) generated in Op2 and sent in Op3. If Op4 fails, return error Request(s). |
| Op5 | (Remote) The Remote Object Client processes Human Interface Service Protocol Request(s) received in Op4 into Processed Remote Object Requests by translating those Request(s) into appropriate instruction set Request(s) for the Desired Utility Service (or Desired Utility Server, if required) and supplementing those |

-continued

| | |
|---|---|
| | translated Request(s) with additional Request(s) to enhance the value of the Desired Utility Service to the user. If Op5 fails, return error Request(s). |
| Op6 | (Remote) Remote Object Client conveys Processed Remote Object Requests generated in Op5 to Desired Utility Service (or Desired Utility Server, if required). If Op6 fails, return error Request(s). |
| Op7 | (Remote) Desired Utility Service receives Processed Remote Object Request(s) generated in Op5 and sent in Op6 from Remote Object Client (or Desired Utility Server, if required), processes Processed Remote Object Request(s), and returns or makes available the results of the processing to the Remote Object Client (or Desired Utility Server, when required). If Op7 fails, return error Request(s). |
| Op8 | (Remote) The Remote Object Client fetches resulting output from the Desired Utility Service, (or Desired Utility Server, if required). If Op8 fails, return error Request (s). |
| Op9 | (Remote) The Remote Object Client processes resulting output from Op8 by encapsulating the resulting output into Human Interface Service Protocol Request(s) and supplementing those Request(s) with additional Human Interface Service Protocol Request(s) to enhance the value to the user. If Op9 fails, return error Request(s). |
| Op10 | (Remote) By practicing the Human Interface Service Protocol and the Network Service Protocol, the Remote Object Client conveys processed Human Interface Service Protocol Request(s) produced in Op9 to the Human Interface Server on the Local Host. If Op10 fails, return error Request(s). |
| Op11 | (Local) By practicing the Human Interface Service Protocol and the Network Service Protocol, the Human Interface Server receives processed Human Interface Service Protocol Request(s) produced in Op9 from the Remote Object Client and implements each Request(s) using the appropriate Human Interface Service. If Op11 fails, return error Request(s). |

For example, data to be displayed visually are conveyed to the visual output portion of the Human Interface Service, audio data are conveyed to the audio output portion of the Human Interface Service, olfactory data are conveyed to the olfactory output portion of the Human Interface Service, tactile data are conveyed to the tactile output portion of the Human Interface Service, and gustatory data are conveyed to the gustatory output portion of the Human Interface Service.

5.3 Events to Terminate a Remote Object

Figure 5G:
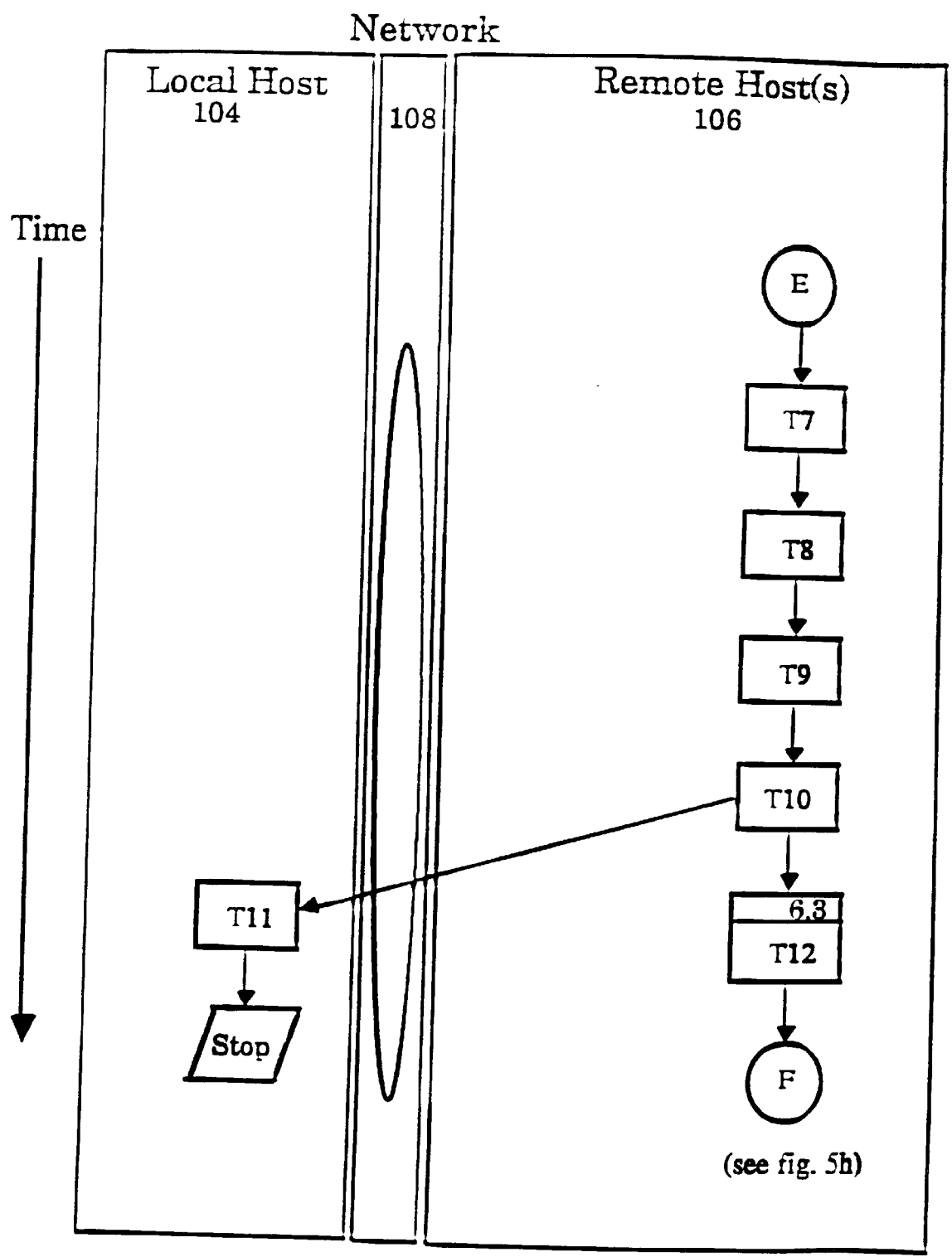
Figure 5H:
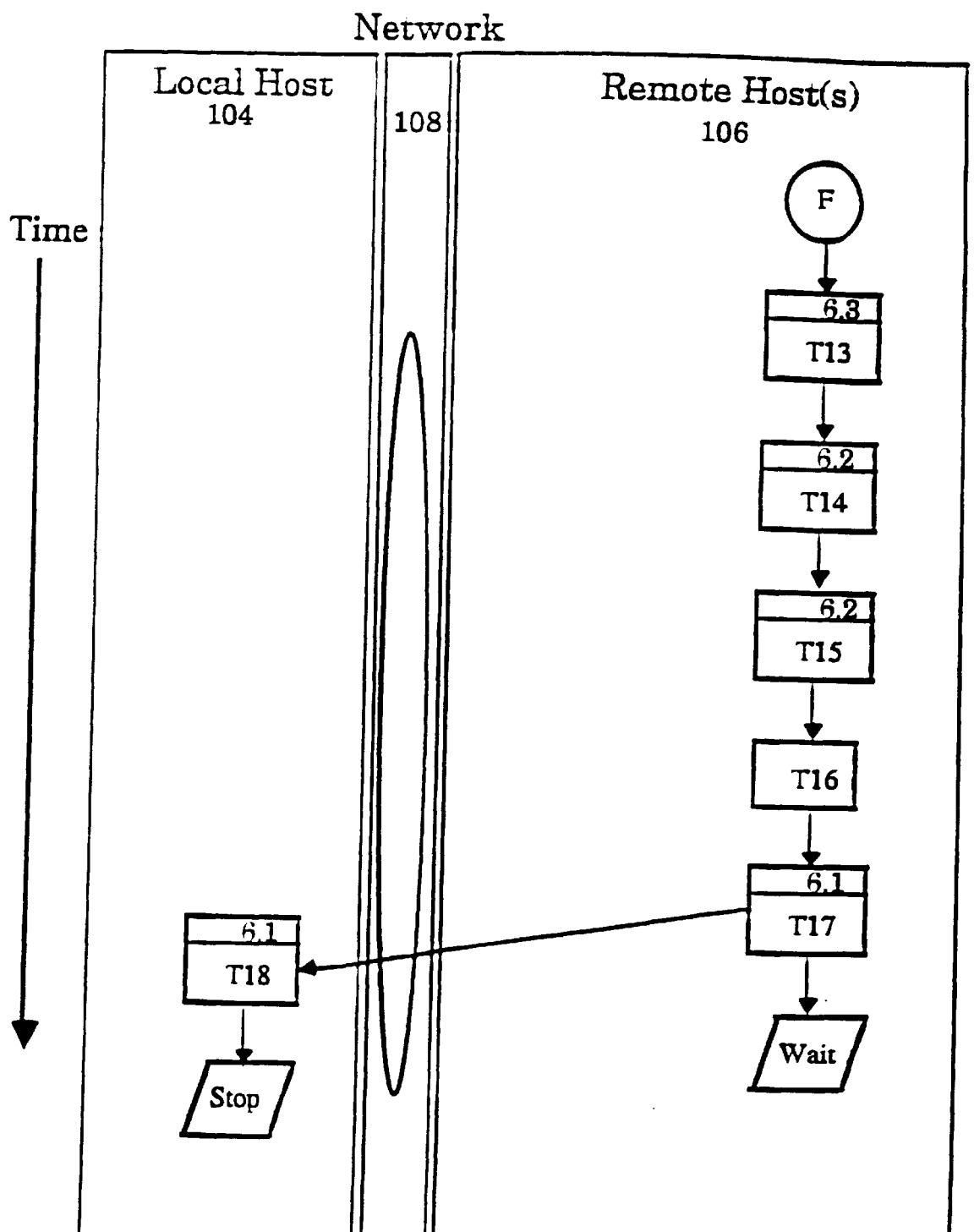
Figure 5I:
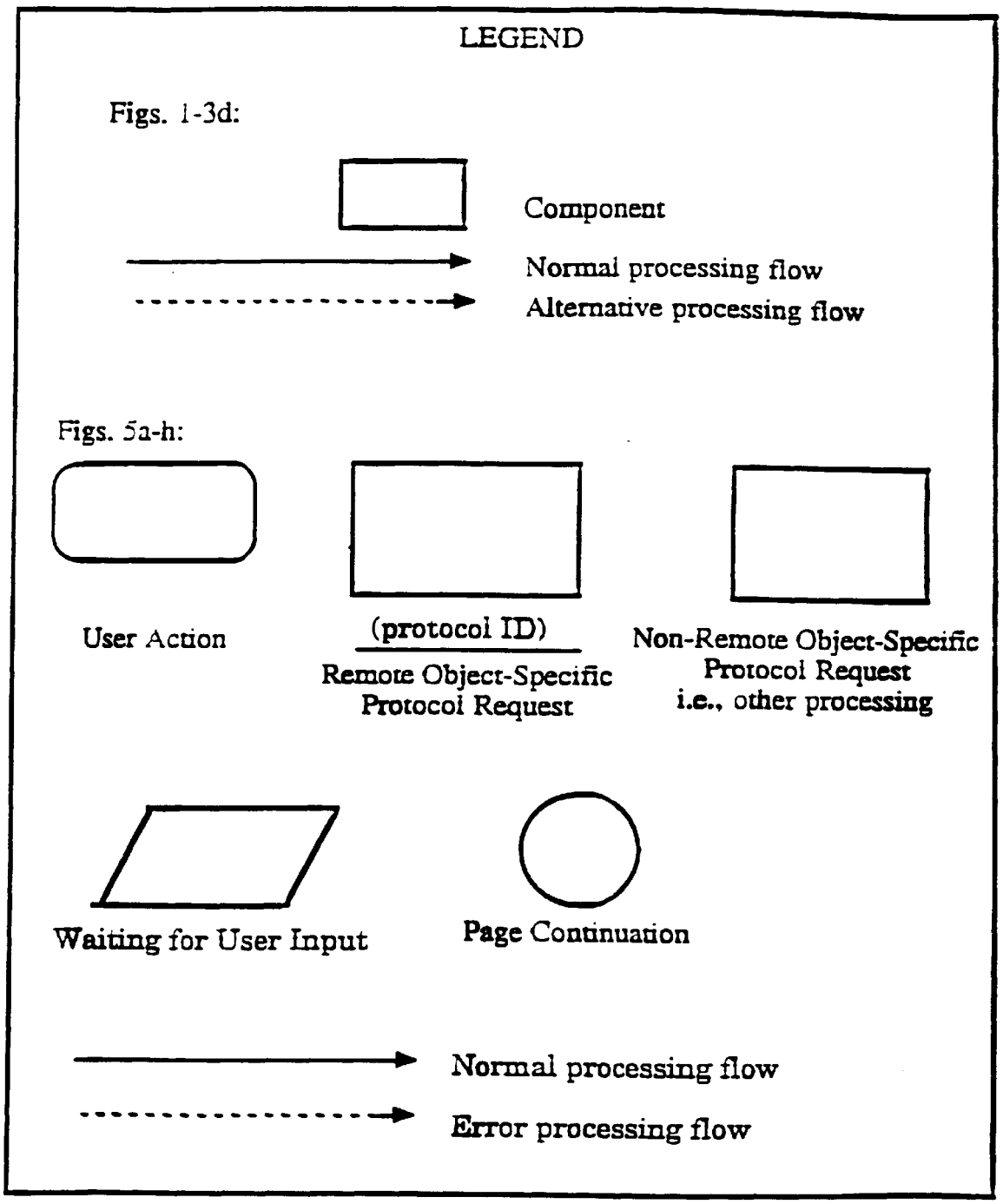

This section references FIGS. 5(f), 5(g), and 5(h).

| | |
|---|---|
| T1 | (Local) Operational process (Op1–Op11) continues until the user decides to terminate a particular Remote Object activated on the Local Host. Termination of any particular Remote Object does not affect simultaneous use of any other Remote Object. |
| T2 | (Local) User manipulates the Human Interface Service to specify termination of a Remote Object. |
| T3 | (Local) The Human Interface Server captures termination Request(s) from T2 and converts termination Request(s) to Human Interface Service Protocol Termination Request(s). |
| T4 | (Local) By practicing the Human Interface Service Protocol and the Network Service Protocol, Human Interface Server transmits Human Interface Service Protocol Termination Request(s) generated in T3 to the Remote Object Client which is to be terminated, on the Remote Host. If T4 fails, return error Request(s). |
| T5 | (Remote) By practicing the Human Interface Service Protocol and the Network Service Protocol, the Remote Object Client receives Human Interface Service Protocol Termination Request(s) generated in T3 and sent in T4. If T5 fails, return error Request(s). |
| T6 | (Remote) The Remote Object Client to be terminated processes Human Interface Service Protocol Termination Request(s) received in T5 into appropriate Request(s) using an instruction set for the Desired Utility Service (or Desired Utility Server, if required). If T6 fails, return error Request(s). |
| T7 | (Remote) The Remote Object Client conveys Requests generated in T6 to the Desired Utility Service (or Desired Utility Server, if required). If T7 fails, return error Request(s). |
| T8 | (Remote) Desired Utility Service (or Desired Utility Server, if required) receives Request(s) from the Remote Object Client to terminate Desired Utility Service functionality for that specific Remote Object Client, and processes those Request(s). If T8 fails, return error Request(s). |
| T9 | (Remote) The Remote Object Client fetches resulting output from the Desired Utility Service (or Desired Utility Server, if required). If T9 fails, return error Request(s). |
| T10 | (Remote) By practicing the Human Interface Service Protocol and the Network Service Protocol, the Remote Object Client issues Human Interface Service Protocol Request(s) to the Human Interface Server to terminate Human Interface Server support for that particular Remote Object and to terminate the connection. If T10 fails, return error Request(s). |
| T11 | (Local) By practicing the Human Interface Service Protocol and the Network Service Protocol, the Human Interface Server receives and implements the Request(s) sent in T10 from the Remote Object Client. If T11 fails, return error Request(s). |
| T12 | (Remote) By practicing Remote Object Protocol 6.3 and the Network Service Protocol, the Remote Object Client sends Remote Object Protocol 6.3 Termination Request(s) to the Starter Service and terminates the Remote Object Client. If T12 fails, return error Request(s). |
| T13 | (Remote) By practicing Remote Object Protocol 6.3 and the Network Service Protocol, the Starter Service receives Remote Object Protocol 6.3 Termination Request(s) from the Remote Object Client. If T13 fails, return error Request(s). |
| T14 | (Remote) By practicing Remote Object Protocol 6.2 and the Network Service Protocol, the Starter Service sends Remote Object Protocol 6.2 Termination Request(s) to the Starter Server and returns to ready state. If T14 fails, return error Request(s). |
| T15 | (Remote) By practicing Remote Object Protocol 6.2 and the Network Service Protocol, the Starter Server receives Remote Object Protocol 6.2 Termination Request(s) from the Starter Service. If T15 fails, return error Request(s). |
| T16 | (Remote) The Starter Server logs a termination event in a status table of the Starter Service maintained by the Starter Server. If T16 fails, return error Request(s). |
| T17 | (Remote) By practicing Remote Object Protocol 6.1 and the Network Service Protocol, the Starter Server sends Remote Object Protocol 6.1 Termination Request(s) to the Starter Client, terminates the network connection to the Starter Client and returns to ready state. If T17 fails, return error Request(s). |
| T18 | (Local) By practicing Remote Object Protocol 6.1 and the Network Service Protocol, the Starter Client receives Remote Object Protocol 6.1 Termination Request(s) from the Starter Server, terminates the network connection to the Starter Server, presents Request(s) to the Human Interface Service to restore representation of the Starter Client to non-executing state, and then terminates Starter Client. If T18 fails, return error Request(s). |

Use of Remote Procedure Calls:

The following steps may be implemented alternatively by Remote Procedure Call (RPC) technology: T12–T13, T14–T15, T17–T18, and Remote Object Protocols 6.1, 6.2, 6.3.

6. Description of Each Protocol

Protocols:
   6.1 Starter Client <—>Starter Server
   6.2 Starter Server <—>Starter Service
   6.3 Starter Service <—>Remote Object Client Remote Object Protocols are used by Remote Specific Object components to interoperate with one another by sending Requests. To facilitate conveyance of Protocol Requests, these Requests may be encapsulated in Network Services Protocol Requests, Human Interface Protocol Requests, or other classes of Requests as appropriate. The Requests are conveyed from sending Component to receiving Component, deencapsulated by the receiving component, and processed according to their content. This practice is consistent with the standard network layering reference model.

Note: Identifiers beginning with L, Op, or T refer to Section 5.

6.1 Protocol: Starter Client(2.11)/Starter Server(2.10)

This protocol, Remote Object Protocol 6.1, facilitates interoperation of a Starter Client and a Starter Server and is used to convey Request(s) to initiate Remote Object service. The protocol is initiated by the activation of a Starter Client. The functions performed by Protocol 6.1 (refer to FIGS. 5(a)–(i), and Section 5) are: L9, L10, T17, and T18.

If L11, L12, or L15 fails, this Protocol (6.1) is used to perform step LX2, which performs step LX1 to present a message to advise the user of status, to advise corrective action, or both, and to terminate or suspend the Starter Client.

If L16, L17, or L18 fails, or L20 times out, this Protocol (6.1) is used to perform step LX4, which performs step LX3, which uses this Protocol to perform step LX2.

This Protocol is a Remote Object-Specific Protocol, and it relies on other protocols such as the Network Service Protocol or other data transmission connectivity protocols practiced on the Local Host and the Remote Host. Remote Object Protocol 6.1 may be alternatively implemented by Remote Procedure Call (RPC) technology.

6.2 Protocol: Starter Server(2.10)/Starter Service(2.9)

This protocol, Remote Object Protocol 6.2, facilitates interoperation of a Starter Server and Starter Service, and is used to convey Request(s) to initiate Remote Object service. The protocol is initiated by the activation of a Starter Server program and Receipt of Request(s). The functions performed by Protocol 6.2 (refer to FIGS. 5(a)–(i), and Section 5) are: L11, L12, L14, T14, and T15.

If L15 fails, this Protocol (6.2) is used to perform step LX3, which is used to perform step LX2, which performs step LX1 to present a message to advise the user of status, to advise corrective action, or both, and to terminate or suspend the Starter Client.

If L16, L17, or L18 fails, or L20 times out, this Protocol (6.2) is used to perform step LX4, which performs step LX3.

This Protocol is a Remote Object-Specific Protocol, and it relies on other protocols such as the Network Service Protocol or other data transmission connectivity protocols practiced on the Remote Host. Remote Object Protocol 6.2 may be implemented alternatively by Remote Procedure Call (RPC) technology.

6.3 Protocol: Starter Service(2.9)/Remote Object Client(2.6)

This protocol, Remote Object Protocol 6.3, facilitates interoperation of a Starter Server and Remote Object Client, and is used to convey Request(s) to primarily to terminate Remote Object service. The protocol is initiated by the activation of a Starter Server program and Receipt of Request(s) from a Starter Service. The functions performed by Protocol 6.3 (refer to FIGS. 5(a)–(i), and Section 5) are: T12 and T13.

If L16, L17, or L18 fails, this Protocol (6.3) is used to perform step LX4, which is used to perform step LX3, which is used to perform step LX2, which performs step LX1 to present a message to advise the user of status, to advise corrective action, or both, and to terminate or suspend the Starter Client.

The Protocol is a Remote Object-Specific Protocol, and it relies on other protocols such as the Network Service Protocol or other data transmission connectivity protocols practiced on the Remote Host. Remote Object Protocol 6.3 may be implemented alternatively by Remote Procedure Call (RPC) technology.

7. Examples of Components and Protocols (2.1) Local Host computer system
Apple Macintosh OS (Class-of-Platform)
IBM PC (DOS or OS/2) (Class-of-Platform)
Sun Workstation (Unix) (Class-of-Platform)
(2.2) Remote Host computer system
IBM 3090 (VM/CMS or MVS) (Class-of-Platform)
Sun (Unix) (Class-of-Platform)
DEC Vax (VMS) (Class-of-Platform)
(2.3) Network
Internet
(2.4) Human Interface Service
Cathode Ray Tube Display
Mouse
Microphone
Loudspeaker
Window Manager
(2.5) Human Interface Server
MacX for Macintosh
Hilmmingbird for IBM PC
Desqview/X for IBM PC
X server for Unix systems
(2.6) Remote Object Client
(as described herein)
(2.7) Desired Utility Service
SPIRES Database Management System
FOCUS Database Management System
(2.8) Desired Utility Server
(as described herein)
(2.9) Starter Service
(as described herein)
(2.10) Starter Server
(as described herein)
Combined Starter Service (2.9) and Starter Server (2.10): forking or spawning a process in Unix
(2.11) Starter Client/Requester
(as described herein)
(Protocol 6.1) Starter Client/Starter Server
(as described herein)
(Protocol 6.2) Starter Server/Starter Service
(as described herein)
(Protocol 6.3) Starter Service/Remote Object Client
(as described herein)
Network Services Protocols
Internet Protocol Suite
Human Interface Services Protocols
X11 X Window Protocol Suite The above description is illustrative and not restrictive. Many variations of the invention will become apparent to those of skill in the art upon review of this disclosure. The scope of the invention should, therefore, be determined not with reference to the above description, but instead should be determined with reference to the appended claims along with their full scope of equivalents.

What is claimed is:

1. A remote access apparatus for providing end-user access through a human interface to a desired remote utility service on a remote host computer, comprising:
   a) a local host computer;
   b) a remote host computer;
   c) a network connection between said local host computer and said remote host computer allowing data transfer therebetween;
   wherein said local host computer further comprises:
      1) a human interface service means, for handling input from, and output to, an end-user;
      2) a human interface server, for mediating requests for human interface services, said requests from human interface clients resident on at least one of said remote host computer and said local host computer, said human interface server operative to process said requests from said human interface clients during normal operation and exception operation; and
      3) a starter client means, for issuing requests to a starter server means on said remote host computer, said requests for initiating interaction with the desired remote utility service on said remote host computer;
   wherein said remote host computer further comprises:
      1) said starter server means, for responding to requests from said starter client means;
      2) a desired remote utility service, resident on said remote host computer and platform-independent of said local host computer;
      3) a remote object client, for issuing requests for human interface services to said human interface server, for issuing requests for said desired remote utility service and for translating a response from said desired remote utility service into a request for human interface services issued to said human interface server; and
      4) a starter service means, for initiating a remote object client indicated by said starter server means.

2. The apparatus of claim 1, wherein said network connection further comprises:
   1) a remote object connection for transferring data between said remote object client and said human interface server resident on or serving said local host computer; and
   2) a starter connection for transferring data necessary to initiate said remote object client, said transferring of data occurring between said starter client means and said starter server.

3. The apparatus of claim 1, wherein said remote host computer further comprises a desired utility server to process requests for said desired remote utility service, said requests comprising at least requests from said remote object client.

4. The apparatus of claim 1, wherein said remote host computer comprises a plurality of physical hosts, interconnected to act together as a single remote host computing means.

5. The apparatus of claim 1, wherein said local host computer comprises a plurality of physical hosts, interconnected to act together as a single local host computing means.

6. The apparatus of claim 1, wherein said starter connection is initiated by said local host computer and said remote object connection is initiated by said remote host computer.

7. A remote access apparatus for providing end-user access through a human interface to a desired remote utility service on a remote host computer, comprising:
   a) a local host computer;
   b) a remote host computer;
   c) a network connection between the local host computer and the remote host computer allowing data transfer therebetween;
   wherein the local host computer further comprises:
      1) a human interface service, for handling input from, and output to, an end-user;
      2) a human interface server, for mediating requests for human interface services, wherein the requests are from human interface clients resident on at least one of the remote host computer and the local host computer, and wherein the human interface server is operative to process the requests for the human interface clients during normal operation and exception operation; and
      3) a starter client which issues requests to a starter server on the remote host computer, wherein the issued requests are for initiating interaction with the desired remote utility service on the remote host computer;
   wherein the remote host computer further comprises:
      1) the starter server;
      2) a desired remote utility service, resident on the remote host computer and platform-independent of the local host computer;
      3) a remote object client, for issuing requests for human interface services to the human interface server, for issuing requests for the desired remote utility service and for translating a response from the desired remote utility service into a request for human interface services issued to the human interface server; and
      4) a starter service which initiates a remote object client indicated by the starter server.

8. The apparatus of claim 7, wherein the network connection further comprises:
   1) a remote object connection for transferring data between the remote object client and the human interface server resident on or serving the local host computer; and
   2) a starter connection for transferring data necessary to initiate the remote object client, wherein the transferring of data occurs between the starter client and the starter server.

9. The apparatus of claim 7, wherein the remote host computer further comprises a desired utility server to process requests for the desired remote utility service, wherein the requests comprise at least requests from the remote object client.

10. The apparatus of claim 7, wherein the remote host computer comprises a plurality of physical hosts, interconnected to act together as a single remote host computing system.

11. The apparatus of claim 7, wherein the local host computer comprises a plurality of physical hosts, interconnected to act together as a single local host computing system.

12. The apparatus of claim 8, wherein the starter connection is initiated by the local host computer and the remote object connection is initiated by the remote host computer.

13. A remote access apparatus for providing end-user access to a desired remote utility service on a remote host computer, comprising:

a) a local host computer;
b) a remote host computer;
c) a network connection between said local host computer and said remote host computer allowing data transfer therebetween;
wherein said local host computer further comprises a first processor and a storage device and:
  1) a human interface service comprising a display device, a keyboard and a mouse;
  2) program code for a process executing on said first processor comprising:
    (a) a human interface server that receives as input requests for access to said human interface service and outputs human interface commands; and
    (b) a starter client that receives input from said human interface service and outputs an access start request for initiating interaction with a desired remote utility service on a remote host computer, the access start request being a request transmitted to a starter server by way of said network connection;
wherein said remote host computer further comprises a second processor, a second storage device and program code to be executed on said second processor for:
  (1) said starter server receiving as input said access start request and outputting an indication of a remote object client corresponding to said access start request;
  (2) a starter service that receives as input said indication received from said starter server and outputs a command to initiate the said remote object client corresponding to said access start request; and
  (3) said remote object client responding to said command from said starter service and outputting commands to said human interface service for interface to an end-user and commands to a desired remote utility service; and
wherein said network connection further comprises a remote object connection for transferring said commands to said human interface service and to said desired remote utility and a starter connection for transferring said access start request.

14. The apparatus of claim 13, wherein said network connection further comprises:
  1) a remote object connection for transferring data between said remote object client and said human interface server resident on or serving said local host computer; and
  2) a starter connection for transferring data necessary to initiate said remote object client, said transferring of data occurring between said starter client means and said starter server.

15. The apparatus of claim 13, wherein said remote host computer further comprises a desired utility server to process requests for said desired remote utility service, said requests comprising at least requests from said remote object client.

16. The apparatus of claim 13, wherein said remote host computer comprises a plurality of physical hosts, interconnected to act together as a single remote host computing means.

17. The apparatus of claim 13, wherein said local host computer comprises a plurality of physical hosts, interconnected to act together as a single local host computing means.

18. The apparatus of claim 13, wherein said starter connection is initiated by said local host computer and said remote object connection is initiated by said remote host computer.

19. Computer readable media containing program code for implementing a method of providing end-user access via a human interface server located at a local host computer to a desired remote utility service on a remote host computer, the local host computer being characterized as local with respect to a network location of an end user and separated from the remote host computer by a network connection, the computer readable media comprising:
  a) program code for initiating a remote host program on the remote host computer;
  b) program code for initiating a local host program on the local host computer;
  b) program code for presenting the end user with an interface for inputting an indication of a desire to access the desired remote utility service;
  c) program code for initiating a starter client process controlled by the local host program in response to the indication;
  d) starter client program code for issuing an access start request over the network connection to a starter server process controlled by the remote host program, wherein the method of issuing the access start request is independent of a platform of the remote host computer;
  e) starter server program code for implementing a starter server process controlled by the remote host process to initiate a remote object client on the remote host computer in response to receipt of the access start request at the remote host computer;
  f) program code for establishing programmatic connectivity over the network connection between the remote object client and the desired remote utility service and between the remote object client and the human interface server;
  g) program code for issuing a human interface server request from the remote object client to the human interface server requesting interface to the end user; and
  h) program code for translating received responses to the human interface server request into a format understandable by the desired remote utility service.

20. A method for providing end-user access via a human interface server located at a local host computer to a desired remote utility service on a remote host computer over a network, the method comprising the steps of:
  a) initiating the human interface server on the local host computer and a starter server on the remote host computer, wherein the local host computer is characterized as local with respect to a network location of an end user;
  b) presenting the end user with an interface for indicating a desire to access the desired remote utility service;
  c) initiating a starter client in response to an indication by the end user of a desire to access the desired remote utility service;
  d) using the starter client to issue an access start request to a starter server over the network, wherein the method of issuing the access start request is independent of a platform of the remote host computer;
  e) using the starter server and a starter service to initiate a remote object client on the remote host computer;
  f) issuing a human interface server request from the remote object client to the human interface server requesting interface to the end user;
  g) translating received responses to the human interface server request into a format understandable by the desired remote utility service;

h) issuing the translated received responses as a desired utility service request from the remote object client to the desired remote utility service;

i) returning a desired utility service response to the desired utility service request from the desired remote utility service to the remote object client;

j) translating the desired utility service responses into a second interface request; and k) issuing the second interface request from the remote object client to the human interface server.

21. A method for providing end-user access via a human interface server located at a local host computer to a desired remote utility service on a remote host computer, the local host computer being characterized as local with respect to a network location of an end user and separated from the remote host computer by a network connection, the method comprising the steps of:

a) initiating a remote host program on the remote host computer and a local host program on the local host computer;

b) presenting the end user with an interface for inputting an indication of a desire to access the desired remote utility service;

c) initiating a starter client process controlled by the local host program in response to the indication;

d) using the starter client process to issue an access start request over the network connection to a starter server process controlled by the remote host program, wherein the method of issuing the access start request is independent of a platform of the remote host computer;

e) using a starter server process controlled by the remote host program to initiate a remote object client on the remote host computer in response to receipt of the access start request at the remote host computer;

f) issuing a human interface server request from the remote object client to the human interface server requesting interface to the end user; and g) translating received responses to the human interface server request into a format understandable by the desired remote utility service.

22. A method for providing end-user access to a database service on a remote host comprising:

a) initiating a starter client on a local host in response to an indication by an end user of a desire to access the database service;

b) sending an access start request from the starter client on the local host to a remote host;

c) receiving the access start request at the remote host;

d) activating a remote object client at the remote host in response to the access start request, wherein the remote object client:

1) translates query information received from the local host in a first format from the first format into a database request format;

2) issues the database request to a database service;

3) receives from the database service a response to the database request;

4) formats the response into a human interface request; and 5) issues the human interface request to a human interface server on the local host; and e) presenting the human interface from the human interface server to the end user on the local host.

23. A computer network for providing end user access to a database, the computer network comprising:

a plurality of computers, each computer including a user input that includes a keyboard and a pointing device and access input from an end user and includes a user output that includes a display that presents output to the end user, the user input and the user output forming a graphical user interface, each computer executing software to issue a request to initiate communication with a remote computer and executing software to generate commands to the graphical user interface;

a database located remotely from the plurality of computers and platform independent of each of the plurality of computers, the database including a plurality of database entries; and a server remotely coupled to the plurality of computers, the server executing software to receive a request to initiate communication from one of the computers and, after the communication is initiated, to receive an access request from one of the computers for access to the database and, in response to the access request, translating the access request into a format understandable by the database and querying the database for at least one of the database entries software executing at the server providing the at least one database entry to the user output of the one of the computers.

24. The computer network of claim 23, wherein the database is resident at the server.

25. The computer network of claim 23, wherein the database is remote from the servers.

* * * * *

UNITED STATES PATENT AND TRADEMARK OFFICE
CERTIFICATE OF CORRECTION

PATENT NO.      : 5,974,444
DATED           : October 26, 1999
INVENTOR(S)     : Allan M. Konrad It is certified that error appears in the above-identified patent and that said Letters Patent is hereby corrected as shown below:

At column 26, line 17 please delete "for" and insert --from-- in its place.
At column 30, line 22, please delete "access" and insert --accepts-- in its place.
At column 30, line 41, please insert --,--after "entries".

Signed and Sealed this

Twenty-seventh Day of March, 2001

*Attest:*

NICHOLAS P. GODICI

*Attesting Officer*

*Acting Director of the United States Patent and Trademark Office*